US008881017B2

(12) United States Patent
Gil et al.

(10) Patent No.: US 8,881,017 B2
(45) Date of Patent: Nov. 4, 2014

(54) SYSTEMS, DEVICES AND METHODS FOR AN INTERACTIVE ART MARKETPLACE IN A NETWORKED ENVIRONMENT

(75) Inventors: Yoram Gil, Inglewood, CA (US); Igal Roytblat, Richmond Hill (CA)

(73) Assignee: Art Porticos, Inc., Inglewood, CA (US)

( * ) Notice: Subject to any disclaimer, the term of this patent is extended or adjusted under 35 U.S.C. 154(b) by 196 days.

(21) Appl. No.: 13/246,507

(22) Filed: Sep. 27, 2011

(65) Prior Publication Data
US 2012/0084661 A1    Apr. 5, 2012

Related U.S. Application Data

(60) Provisional application No. 61/389,567, filed on Oct. 4, 2010.

(51) Int. Cl.
*G06F 3/00* (2006.01)

(52) U.S. Cl.
USPC ........... 715/738; 715/703; 715/730; 715/753; 715/756; 715/757; 715/758; 715/815; 715/848

(58) Field of Classification Search
None
See application file for complete search history.

(56) References Cited

U.S. PATENT DOCUMENTS

| | | | |
|---|---|---|---|
| 6,928,615 B1 * | 8/2005 | Haitsuka et al. | 715/738 |
| 8,245,139 B2 * | 8/2012 | Michelman | 715/734 |
| 8,370,749 B2 * | 2/2013 | Morse et al. | 715/738 |
| 2005/0182645 A1 * | 8/2005 | Ehlis et al. | 705/1 |
| 2006/0129933 A1 * | 6/2006 | Land et al. | 715/723 |
| 2008/0222295 A1 * | 9/2008 | Robinson et al. | 709/227 |
| 2008/0246759 A1 * | 10/2008 | Summers | 345/420 |

OTHER PUBLICATIONS

Art Porticos, URL=http://www.artporticos.com/, download date Aug. 12, 2011.
Art Porticos > Log In, URL=http://www.artporticos.com/wp-login.php, download date Aug. 12, 2011.
Art Porticos—Galleries, URL=http://www.artporticos.com/?page_id=6396, download date Aug. 12, 2011.
Art Porticos—Art Services, URL=http://www.artporticos.com/?page_id=311, download date Aug. 12, 2011.
Art Porticos—Schedule, URL=http://www.artporticos.com/?page_id=3282, download date Aug. 12, 2011.
Art Porticos—Contact, URL=http://www.artporticos.com/?page_id=96, download date Aug. 12, 2011.

* cited by examiner

*Primary Examiner* — Anil N Kumar
(74) *Attorney, Agent, or Firm* — Seed IP Law Group PLLC

(57) ABSTRACT

Information related to art is provided in networked computing environments wherein users can participate in public or private online interactive video conferences, chat rooms and other online sessions led by art galleries or art gallery affiliates. User's may switch between public sessions and private sessions when ready to make a transaction related to an art object or artist presented in a public session. In private online sessions, potential consumers may also electronically provide the art gallery pictures, diagrams and photographs of an area in which they are interested in placing certain art objects. An image of the art object is shown within the picture to scale with other objects such as a wall, and angle of view. Users may also see the art objects to scale next to other stock images of familiar reference objects during the online session.

23 Claims, 18 Drawing Sheets

US 8,881,017 B2

SYSTEMS, DEVICES AND METHODS FOR AN INTERACTIVE ART MARKETPLACE IN A NETWORKED ENVIRONMENT

CROSS-REFERENCE TO RELATED APPLICATIONS

This application claims benefit under 37 U.S.C. 119(e) to U.S. patent application Ser. No. 61/389,567, filed Oct. 4, 2010, which is incorporated by reference herein in its entirety.

BACKGROUND

1. Field

This disclosure generally relates to networked computing environments, and particularly to providing information related to art in networked computing environments.

2. Description of the Related Art

Currently, mid-range art galleries (e.g., dealing art priced from $5K up to $100K) have been unable to create an effective online marketplace for themselves. The overwhelming amount of online information is not always user friendly, is often confusing, and can create hostility and distrust even with seasoned collectors. This underscores the notion of many potential consumers' desire to see the art in person before making a purchase, which is restraining mid-range priced fine art sales online. Combined with ineffective Web presence, changes in consumer habits, fluctuating and harsh economic conditions and dwindling sales, this presents a threat to the art industry. As art dealers find it ever more difficult to operate profitably, artists have less opportunity to have their work viewed by knowledgeable patrons. Potential patrons also find it increasingly difficult to gain access to new artwork and new artists, or to receive the valuable information which an experienced dealer can provide. Hence, new approaches to fostering the exchange of information related to art in networked systems are desirable.

BRIEF SUMMARY

A computer-implemented method of providing interactive online sessions for presenting art objects may be summarized as including providing remote access to a user to participate remotely in an online session of a first type; creating the online session of the first type; remotely displaying, under control of at least one session leader of the online session of the first type, a number of images of a plurality of art objects to the user during the online session of the first type; electronically receiving an indication of interest of the user to participate in an online session of a second type based on a user's interest in one of the art objects; creating the online session of the second type; and providing remote access to the user to participate remotely, under control of at least one session leader of the online session of the second type, in the online session of the second type which is restricted to particular users.

The particular users to which the online session of the second type is restricted may consist of an art sales representative as being the at least one session leader of the online session of the second type, and a consumer. The consumer may consist of multiple users that are part of a single art purchasing entity. The consumer may consist of a single user and a guest user of the single user. The particular users to which the online session of the second type is restricted may consist of the at least one session leader of the online session of the second type and a consumer.

The computer-implemented method of providing interactive online sessions for presenting art objects may further include remotely switching the user from the session of the first type to the session of the second type; and keeping active the session of the first type for the user until the user is switched to the session of the second type.

Information may be remotely provided in a first window on a display of the user corresponding to the session of the first type and the remotely switching may include remotely displaying a second window on the display of the user corresponding to the session of the second type; discontinuing access to information provided in the first window once the user activates the second window; and providing information in the second window related to the session of the second type.

The online session of the first type may be able to have multiple potential consumers as participants and the online session of the second type may be electronically restricted to a particular potential consumer from the online session of the first type.

The computer-implemented method of providing interactive online sessions for presenting art objects may further include during the session of the second type, receiving a selection of an image of the one of the art objects; receiving a selection of an image of a first reference object; and in response to the receiving the selection of the image of the one of the art objects and receiving the selection of the image of the first reference object, electronically displaying to a remote user of the online session the selected image of the first reference object, to scale, concurrently in relation to the image of the one of the art objects based on relative actual or approximate sizes of the one of the art objects and the first reference object.

A computer-implemented method of providing interactive online sessions for presenting art objects may be summarized as including electronically providing access to an online session; receiving, from at least one session leader of the online session, a selection of an image of a first object of interest within the online session wherein the first object of interest is an art object; receiving, from the at least one session leader, a selection of an image of a first reference object within the online session; and within the online session and in response to the receiving the selection of the image of the first object of interest and receiving the selection of the image of the first reference object, electronically displaying to a remote user of the online session the selected image of the first reference object, to scale, concurrently in relation to the selected image of the first object of interest based on relative actual or approximate sizes of the first object of interest and the first reference object.

The displaying to a remote user of the online session the selected image of the first reference object, to scale, concurrently in relation to the selected image of the first object of interest may include displaying the selected image of the first object next to an image of first reference object.

The computer-implemented method of providing interactive online sessions for presenting art objects may further include receiving a selection of an image of second reference object; in response to the receiving the selection of the image of the second reference object, adjusting either a size of the displayed image of the first object of interest or a size of the displayed image of the second reference object according to scale based on relative actual or approximate sizes of the first object of interest and the second reference object; and automatically displaying the selected image of the second reference object concurrently in relation to the selected image of the first object of interest.

The computer-implemented method of providing interactive online sessions for presenting art objects may further include receiving input to move the image of the first object of interest or image of the first reference object; and in response to the received input, automatically moving the first object of interest or image of the first reference object relative to each other.

The computer-implemented method of providing interactive online sessions for presenting art objects may further include receiving input to zoom in or zoom out a view of the image of the first object of interest or image of the first reference object; and in response to the received input, automatically zooming in or zooming out a view of both the image of the first object of interest and the image of the first reference object the same amount.

The image of the first object of interest or image of the first reference object may be a three dimensional image and may further include receiving input to rotate a view of the three dimensional image of the first object of interest or a view of the three dimensional image of the first reference object; and in response to the received input, rotating the view of the three dimensional image of the first object of interest or rotating the view of the three dimensional image of the first reference object.

The computer-implemented method of providing interactive online sessions for presenting art objects may further include receiving an indication of interest regarding the first object of interest; and in response to the received indication of interest, automatically recording the indication of interest; and electronically placing an order for the first object of interest.

A networked computing system may be summarized as including at least one networked computer, including at least one processor and at least one processor-readable storage medium that non-transitorily stores instructions that when executed by the at least one processor causes the at least one processor to: electronically provide access to an online session; receive, from at least one session leader of the online session, a selection of an image of a first object of interest, wherein the first object of interest is an art object; receive, from the at least one session leader of the online session, a selection of an image of a first reference object; and in response to receiving the selection of the image of the first object of interest and receiving the selection of the image of the first reference object, electronically display concurrently in relation to the selected image of the first object of interest based on relative actual or approximate sizes of the first object of interest and the first reference object.

The instructions may further cause the at least one processor to display, to scale, the selected image of the first object of interest next to the image of first reference object.

The instructions may further cause the at least one processor to: receive a selection of an image of second reference object; in response to receiving the selection of the image of the second reference object, adjust either a size of the displayed image of the first object of interest or a size of the image of the second reference object according to scale based on relative actual or approximate sizes of the first object of interest and the second reference object; and automatically display the selected image of the second reference object concurrently in relation to the selected image of the first object of interest.

The instructions may further cause the at least one processor to: receive input to move the image of the first object of interest or image of the first reference object; and in response to the received input, automatically move the first object of interest or image of the first reference object relative to each other.

The instructions may further cause the at least one processor to: receive input to zoom in or zoom out a view of the image of the first object of interest or image of the first reference object; and in response to the received input, automatically zoom in or zoom out a view of both the image of the first object of interest and the image of the first reference object the same amount and at the same time.

The image of the first object of interest or image of the first reference object may be a three dimensional image and the instructions may further cause the at least one processor to: receive input to rotate a view of the three dimensional image of the first object of interest or a view of the three dimensional image of the first reference object; and in response to the received input, rotate the view of the three dimensional image of the first object of interest or rotate the view of the three dimensional image of the first reference object.

The instructions may further cause the at least one processor to: receive an indication of interest regarding the first object of interest; and in response to the received indication of interest, automatically record the indication of interest; and electronically place an order for the first object of interest.

A networked computing system may be summarized as including at least one networked computer, including at least one processor and at least one processor-readable storage medium that non-transitorily stores instructions that when executed by the at least one processor causes the at least one processor to: provide remote access to a user to participate remotely in an online session of a first type; create the online session of the first type; remotely display, under control of at least one session leader of the online session of the first type, a number of images of a plurality of art objects to the user during the online session of the first type; electronically receive an indication of interest of the user to participate in an online session of a second type based on a user's interest in one of the art objects; create the online session of the second type; and provide remote access, under control of at least one session leader of the online session of the second type, to the user to participate remotely in the online session of the second type which is restricted to particular users.

A computer-implemented method of providing interactive online sessions for presenting objects may be summarized as including electronically providing access to an online art viewing session; receiving a digital image data that represents an image of a physical place in which an art object of interest may be potentially placed; receiving a selection, from an image of the art object of interest within the online session; and within the online session, digitally superimposing the image of the art object of interest on the image of the place, to scale, at least proximate a particular reference object in the image of the place and at an exact or approximate angle of view corresponding to an angle of view and perceived distance of the particular reference object within the image of the place from a point of view from which the image of the place was taken.

A networked computing system may be summarized as including at least one networked computer, including at least one processor and at least one processor-readable storage medium that non-transitorily stores instructions that when executed by the at least one processor causes the at least one processor to: electronically provide access to an online art viewing session; receive digital image data that represents an image of a physical place in which an art object of interest may be potentially placed; receive a selection, from at least one session leader of the online session, of an image of the art object of interest within the online session; and within the online session, digitally superimpose the image of the art object of interest on the image of the place, to scale, at least proximate a particular reference object in the image of the place and at an exact or approximate angle of view corresponding to an angle of view and perceived distance of the particular reference object within the image of the place from a point of view from which the image of the place was taken.

At least one computer-readable medium that stores instructions that when executed by at least one computer system may cause the at least one computer system to perform: electronically providing access to an online art viewing session; receiving a digital image data that represents an image of a physical place in which an art object of interest may be potentially placed; receiving a selection of an image of the art object of interest within the online session from at least one session leader of the online session; and within the online session, digitally superimposing the image of the art object of interest on the image of the place, to scale, at least proximate a particular reference object in the image of the place and at an exact or approximate angle of view corresponding to an angle of view and perceived distance of the particular reference object within the image of the place from a point of view from which the image of the place was taken.

At least one computer-readable medium that stores instructions that when executed by at least one computer system may cause the at least one computer system to perform: electronically providing access to an online session; receiving a selection of an image of a first art object of interest from at least one session leader of the online session; receiving a selection of an image of a first reference object, from at least one session leader of the online session; and in response to the receiving the selection of the image of the first object of interest and receiving the selection of the image of the first reference object, electronically displaying, to scale, the selected image of the first reference object concurrently in relation to the selected image of the first object of interest based on relative actual or approximate sizes of the first object of interest and the first reference object.

At least one computer-readable medium that stores instructions that when executed by at least one computer system may cause the at least one computer system to perform: providing remote access to a user to participate remotely in an online session of a first type; creating the online session of the first type; remotely displaying, under control of at least one session leader of the online session of the first type, a number of images of a plurality of art objects to the user during the online session of the first type; electronically receiving an indication of interest of the user to participate in an online session of a second type based on a user's interest in one of the art objects; creating the online session of the second type; and providing remote access, under control of at least one session leader of the online session of the second type, to the user to participate remotely in the online session of the second type which is restricted to particular users.

A computer-readable storage medium may store a dynamic image list, which can be mounted separately or in combinations, or removed, and which remains available throughout a current session and future session. The dynamic list may maintain a defined number of selections or combinations, whether objects d' art, walls, furnishings or combinations thereof.

Any of the above may be provide via an application or applet executing on a mobile or Web enabled handheld computing or communications device, for example a smartphone or tablet device. Applets may be distributed via a central distribution site, for example the "APP STORE"™ operated by Apple.

The particular users to which the online session of the second type is restricted may consist of an art sales representative and a consumer.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
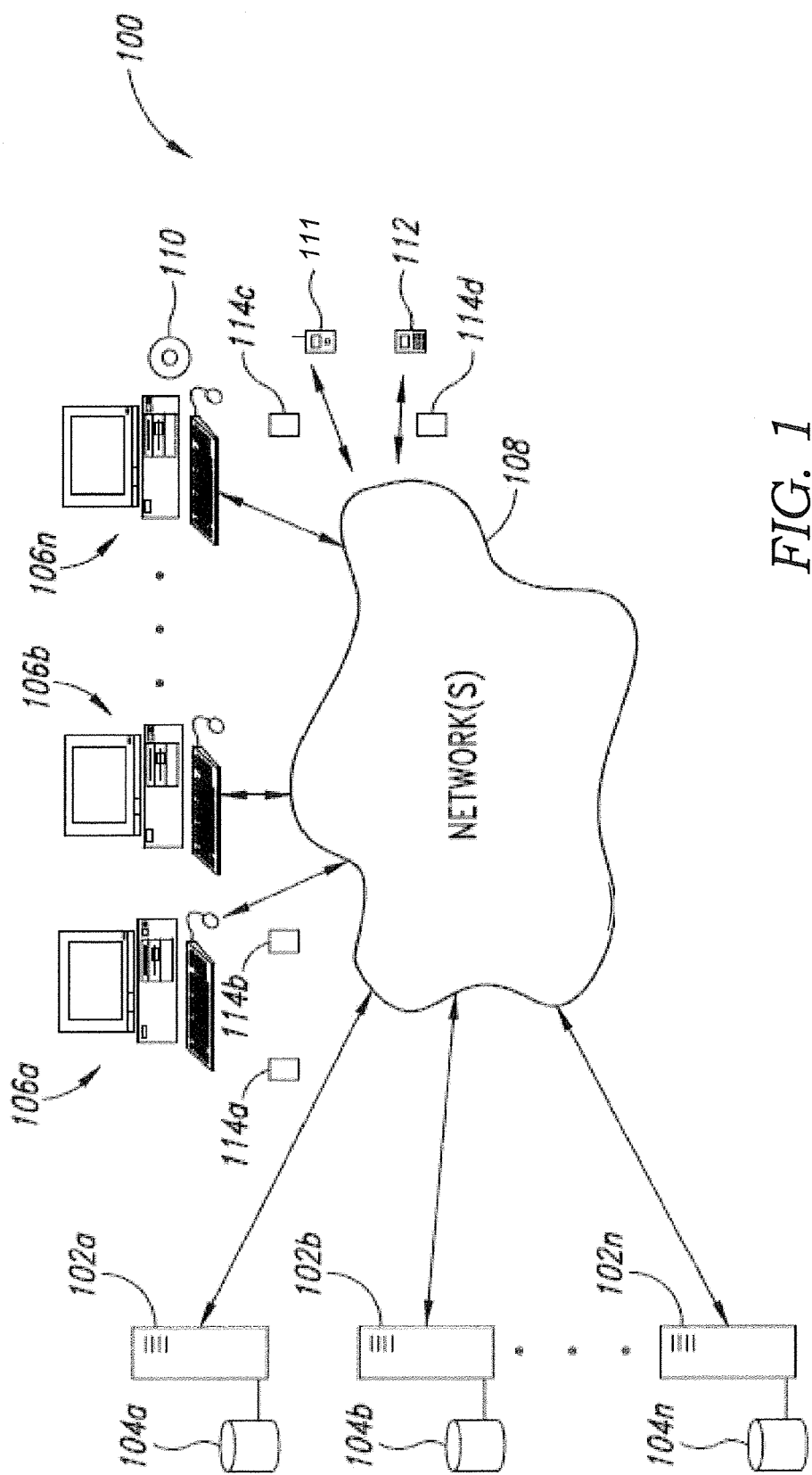
FIG. 1 is a schematic diagram of a networked environment, including a number of servers and a number of clients communicatively coupled to the servers by one or more networks, of which systems, devices and methods for an interactive art marketplace may be a part, or in which they may be implemented, according to one illustrated embodiment.

FIG. 1 shows a networked environment 100, including servers and clients communicatively coupled to the servers by one or more networks, of which systems, devices and methods for an interactive art marketplace may be a part, or in which they may be implemented, according to one illustrated embodiment.

The network environment 100 includes a number of server computing systems 102a-102n (collectively 102). The server computing systems 102 include processors that execute server instructions (i.e., server software) stored on computer-readable storage media to provide server functions in the network environment 100. For example, the server computing systems 102 may serve files, including, but not limited to, videos or images of art objects, stored in one or more databases or other computer-readable storage media 104a-104n (collectively 104). Art objects (i.e., objets d'art) as defined herein may include, but are not limited to: paintings, drawings, etchings, glasswork, sculptures, designs, fine art, designed objects, artwork made of any physical materials, photographs, film, video, digital media artwork, multimedia artwork, architectural or landscape design structures, gardens, or elements, musical compositions, musical improvisation performance, a literary or poetic composition, a performance in live theater, ballet, opera, a computer program, or a conceptual art piece or performance art, etc.

The network environment 100 includes a number of client computing systems 106a-106n (collectively 106) selectively communicatively coupled to one or more of the server computing systems 102 via one or more communications networks 108. The client computing systems 106 include one or more processors that execute one or more sets of communications instructions (e.g., browser instructions) stored on any of a variety of computer-readable storage media 110 (only one illustrated in FIG. 1). The client computing systems 106 may take a variety of forms, for instance desktop or laptop personal computers, work stations, mini-computers, mainframe computers, or other computational devices with microprocessors or microcontrollers which are capable of networked communications. The client computing systems 106 may be communicatively coupled to the rest of the network 108 via wired, wireless or a combination of wired and wireless communications channels.

The network environment 100 includes a number of telecommunications devices 111 (only one illustrated). Such telecommunications devices 111 may, for example, take the form of Internet or Web enabled cellular phones. The network environment 100 also includes a number of personal digital assistant (PDA) devices 112 (only one illustrated). Such PDA devices 112 may, for example, take the form of Internet or Web enabled PDAs (e.g., iPHONE®, iPAD®, TREO®, BLACKBERRY®), which may, for example, execute a set of browser instructions or program. The network environment 100 may include any number of a large variety of other devices that are capable of some type of networked communications. The telecommunications devices 110, PDA devices 112, as well as any other devices, may be communicatively coupled to the rest of the network 108 via wired, wireless or a combination of wired and wireless communications channels.

The one or more communications networks 108 may take a variety of forms. For instance, the communications networks 108 may include wired, wireless, optical, or a combination of wired, wireless and/or optical communications links. The one or more communications networks 108 may include public networks, private networks, unsecured networks, secured networks or combinations thereof. The one or more communications networks 108 may employ any one or more communications protocols, for example TCP/IP protocol, UDP protocols, IEEE 802.11 protocol, as well as other telecommunications or computer networking protocols. The one or more communications networks 108 may include what are traditionally referred to as computing networks and/or what are traditionally referred to as telecommunication networks or combinations thereof. In at least one embodiment, the one or more communications networks 108 includes the Internet, and in particular, the Worldwide Web or (referred to herein as "the Web"). Consequently, in at least one embodiment, one or more of the server computing systems 102 execute server software to serve HTML source files or Web pages 114a-114d (collectively 114), and one or more client computing systems 106, telecommunications devices 110 and/or PDAs 112 execute browser software to request and display HTML source files or Web pages 114.

The network environment 100 includes an interactive art marketplace system. The interactive art marketplace system may include one or more server computing systems 102, databases 104 and one or more client systems 106, telecommunications devices 111, and/or PDA devices 112.

The one or more server computing systems 102 execute instructions stored on computer-readable storage media that cause the server computing systems 102 to provide art presentation and art presentation services, art information, art purchasing services and provide live synchronous and bi-lateral or multi-lateral public or private communications during or in connection with such services to and between one or more client systems 106, telecommunications devices 111, and/or PDA devices 112. Also, the one or more affiliate client systems 106, telecommunications devices 111, and/or PDA devices 112 may also provide such services to others under control of and in connection with the one or more server systems 102 to other client systems 106, telecommunications devices 111, and/or PDA devices. For instance, one or more server computing systems 102 may provide a Web page to one or more client systems 106 displaying particular pieces of art in during a live presentation being provided over the Web by the one or more server computing systems 102 or by one or more affiliate client systems 106.

The instructions may also cause the one or more server computing systems 102 to provide information to a client computing system or other device to facilitate viewing online of particular art objects in various customized environments, and also to facilitate online purchasing of the various art objects. For example, a picture of a perspective view of an area in which the art is to be placed may be uploaded from the one or more client systems 106 to the one or more server computing systems 102. The one or more server computing systems may then facilitate placing an image of an art object in various areas in the picture, adjusting the image of the art object for the particular angle of view as determined by the one or more server computing systems from the uploaded picture and other provided information.

Although not required, the embodiments will be described in the general context of computer-executable instructions, such as program application modules, objects, or macros stored on computer- or processor-readable storage media and executed by a computer or processor. Those skilled in the relevant art will appreciate that the illustrated embodiments as well as other embodiments can be practiced with other affiliate system configurations and/or other computing system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

Figure 2:
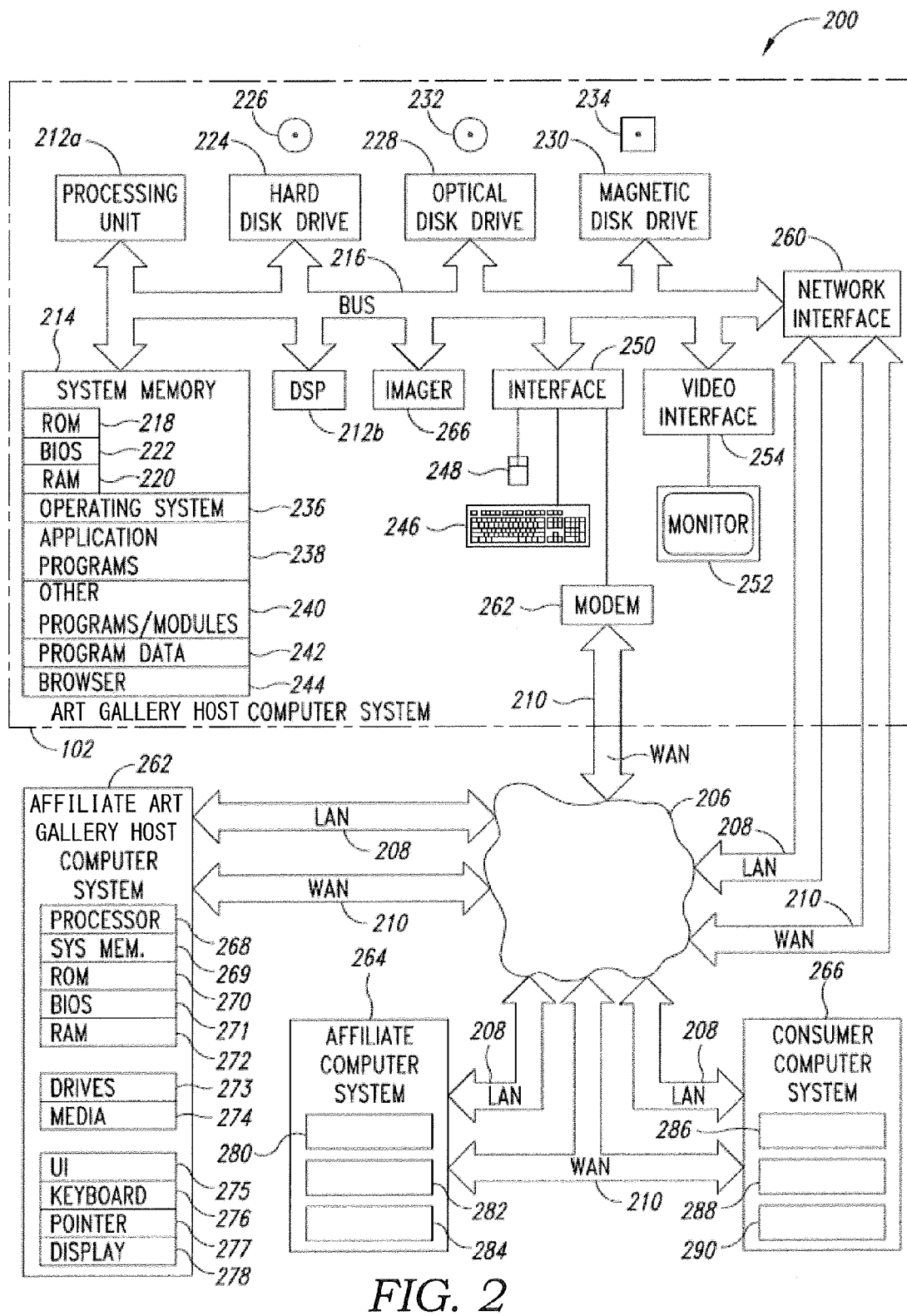
FIG. 2 is a schematic diagram of an electronic commerce environment having an art gallery host computer system, an affiliate art gallery host computer system, another affiliate computer system and a consumer computer system, communicatively connected over a network, according to one illustrated embodiment.

FIG. 2 shows an electronic commerce environment 200 comprising one or more art gallery host computer systems 102, affiliate art gallery host computer systems 262, other affiliate computer systems 264, and consumer computer systems 266, communicatively coupled by one or more communications channels, for example one or more local area networks (LANs) 208 or wide area networks (WANs) 210. The art gallery host computer system 102 will at times be referred to in the singular herein, but this is not intended to limit the embodiments to a single device since in typical embodiments, there may be more than one art gallery host computer system or devices involved. Unless described otherwise, the construction and operation of the various blocks shown in FIG. 2 are of conventional design. As a result, such blocks need not be described in further detail herein, as they will be understood by those skilled in the relevant art.

The art gallery host computer system 102 may include one or more processing units 212a, 212b (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the art gallery host computer system 102, such as during start-up.

The art gallery host computer system 102 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer readable instructions, data structures, program modules and other data for the art gallery host computer system 102. Although the depicted art gallery host computer system 102 is illustrated employing a hard disk 224, optical disk 228 and magnetic disk 230, those skilled in the relevant art will appreciate that other types of computer-readable storage media that can store data accessible by a computer may be employed, such as magnetic cassettes, flash memory, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. Application programs 238 may include instructions that cause the processor(s) 212 to automatically provide art presentation and art presentation services, art information, art purchasing services and provide live synchronous multilateral and bi-lateral public or private communications during or in connection with such services to and between one or more affiliate systems 262, 264 or consumer client systems 266. Other program modules 240 may include instructions for handling security such as password or other access protection and communications encryption. The system memory 214 may also include communications programs for example a Web client or browser 244 for permitting the art gallery host computer system 102 to access and exchange data with sources such as Web sites of the Internet, corporate intranets, extranets, or other networks as described below, as well as other server applications on server computing systems such as those discussed further herein. The browser 244 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google and Microsoft of Redmond, Wash.

While shown in FIG. 2 as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the magnetic disk 234 of the magnetic disk drive 230.

An operator can enter commands and information into the art gallery host computer system 102 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The art gallery host computer system 102 can include other output devices, such as speakers, printers, etc.

The art gallery host computer system 102 can operate in a networked environment using logical connections to one or more remote computers and/or devices as described above with reference to FIG. 1. For example, the art gallery host computer system 102 can operate in a networked environment using logical connections to one or more affiliate art gallery network server computer systems 262, other affiliate computer systems 264 and/or consumer computer systems 266. Communications may be via a wired and/or wireless network architecture, for instance wired and wireless enterprise-wide computer networks, intranets, extranets, and the Internet. Other embodiments may include other types of communication networks including telecommunications networks, cellular networks, paging networks, and other mobile networks.

The affiliate art gallery host computer system 262 may take the form of a conventional mainframe computer, mini-computer, workstation computer, personal computer (desktop or laptop), or handheld computer. The affiliate art gallery host computer system 262 may include a processing unit 268, a system memory 269 and a system bus (not shown) that couples various system components including the system memory 269 to the processing unit 268. The affiliate art gallery host computer system 262 will at times be referred to in the singular herein, but this is not intended to limit the embodiments to a single affiliate art gallery host computer system 262 since in typical embodiments, there may be more than one affiliate art gallery host computer system 262 or other device involved. Non-limiting examples of commercially available computer systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 268 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks of the affiliate art gallery host computer system 262 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270 and random access memory ("RAM") 272. A basic input/output system ("BIOS") 271, which can form part of the ROM 270, contains basic routines that help transfer information between elements within the peripheral computing system 114, such as during start-up.

The affiliate art gallery host computer system 262 may also include one or more media drives 273 (e.g., a hard disk drive, magnetic disk drive, and/or optical disk drive) for reading from and writing to computer-readable storage media 274 (e.g., hard disk, optical disks, and/or magnetic disks). The computer-readable storage media 274 may, for example, take the form of removable media. For example, hard disks may take the form of a Winchester drives, optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated computer-readable storage media 274, provide nonvolatile storage of computer readable instructions, data structures, program modules and other data for the affiliate art gallery host computer system 262. Although described as employing computer-readable storage media 274 such as hard disks, optical disks and magnetic disks, those skilled in the relevant art will appreciate that affiliate art gallery host computer system 262 may employ other types of computer-readable storage media that can store data accessible by a computer, such as magnetic cassettes, flash memory cards, digital video disks ("DVD"), Bernoulli cartridges, RAMs, ROMs, smart cards, etc. Data or information, for example, data from customer relationship management (CRM) programs or tools, third party tracking programs or tools, etc., can be stored in the computer-readable storage media 274.

Program modules, such as an operating system, one or more application programs, other programs or modules and program data, can be stored in the system memory 269. Program modules may include instructions for handling security such as password or other access protection and communications encryption. The system memory 269 may also include communications programs for example a Web client or browser that permits the affiliate art gallery host computer system 262 to access and exchange data with sources such as Web sites of the Internet, corporate intranets, extranets, or other networks as described below, as well as other server applications on server computing systems such as those discussed further below. The browser may, for example be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269, the operating system, application programs, other programs/modules, program data and/or browser can be stored on the computer-readable storage media 274 of the media drive(s) 273. An operator can enter commands and information into the affiliate art gallery host computer system 262 via a user interface 275 through input devices such as a touch screen or keyboard 276 and/or a pointing device 277 such as a mouse. Other input devices can include a microphone, joystick, game pad, tablet, scanner, etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278 may be coupled to the system bus via a video interface, such as a video adapter. The affiliate art gallery host computer system 262 can include other output devices, such as speakers, printers, etc.

The affiliate art gallery host computer system 262 includes instructions stored in computer-readable storage media that cause the processor(s) of the affiliate art gallery host computer system 262 to implement affiliate art gallery program functions. For example, the instructions may cause the processor(s) to provide communication channels to affiliate art galleries for the affiliate art galleries to remotely guide or participate in a live art presentation controlled or directed by the art gallery host computer system 102, provide images of art objects and art information to the art gallery host computer system 102 or consumer computer system 266, perform and/or facilitate online art purchase, rental, or trial period transactions, and provide pre-recorded on-demand information content regarding various art objects and/or art presentations of interest to the art gallery host computer system 102 and/or consumer computer system 266.

The affiliate computer system 264 may be of another entity affiliated with the art gallery such as another affiliated art dealer, expert, artist studio, museum, or art auction house, and may take a variety of forms, for example one or more personal computers, server computers, mainframe computers, minicomputers, microcomputers or workstations. In some embodiments, the art gallery host computer system 102, affiliate art gallery computer system 262 and/or affiliate computer system 264 may be operated, hosted, owned or organized by one entity, which is itself not an art gallery and the art gallery host entity and/or other affiliate entities may be participating in the interactive art marketplace in exchange for a percentage of revenue. The affiliate computer system 264 may have identical or similar components to the previously described computer systems, for example a processing subsystem 280 including one or more processor and computer-readable memories, a media subsystem including one or more drives and computer-readable storage media, and one or more user interface subsystems 282 including one or more keyboards, keypads, displays, pointing devices, graphical interfaces and/or printers.

The affiliate computer system 264 includes instructions stored in computer-readable storage media that cause the processor(s) of the affiliate computer system 264 to implement affiliate functions. For example, the instructions may cause the processor(s) to provide communication channels to affiliate for the affiliate to remotely guide or participate in a live art presentation controlled or directed by the art gallery host computer system 102, provide images of art objects and art information to the art gallery host computer system 102, affiliate art gallery host computer system 262, and/or consumer computer system 266, perform and/or facilitate online art purchase, rental, or trial period transactions, and provide additional pre-recorded on-demand information content regarding various art objects and/or art presentations of interest to the art gallery host computer system 102, affiliate art gallery host computer system 262, and/or consumer computer system 266, and submit any required reporting to the art gallery host computer system 102 and/or affiliate art gallery host computer system 262.

The potential customer or consumer computer system 266 may take a variety of forms, for example one or more personal computers, server computers, mainframe computers, minicomputers, microcomputers or workstations. The potential customer or consumer computer system 266 may have identical or similar components to the previously described computer systems, for example a processing subsystem 286 including one or more processor and computer-readable memories, a media subsystem 288 including one or more drives and computer-readable storage media, and one or more user interface subsystems 290 including one or more keyboards, keypads, displays, pointing devices, graphical interfaces and/or printers.

The potential customer or consumer computer system 266 may include instructions that enable a customer to receive advertising and links to attend online public and/or private guided presentations provided by the art gallery host computer system 102, by the affiliate art gallery host computer system 262 or by the affiliate computer system 264 as directed by the art gallery host computer system. The potential customer or consumer computer system 266 may also include instructions that enable the customer to upload pictures of environments in which art objects may potentially be placed, receive customized images and photos including particular art objects in different environments including those of the uploaded pictures, receive on-demand multimedia presentations regarding particular art objects or artists, purchase items electronically, and place orders for art object purchases, rentals, or trial periods.

Figure 3:
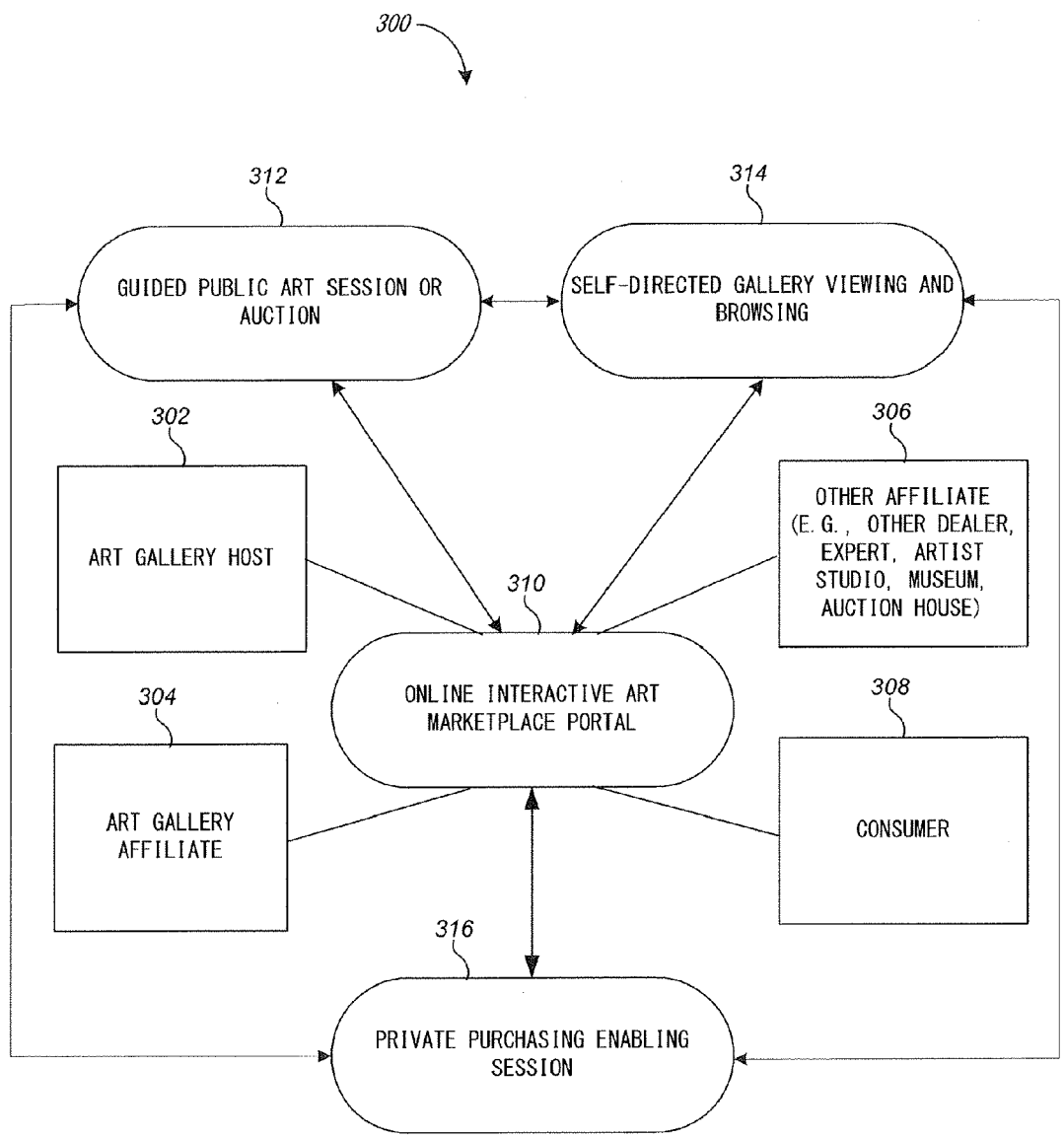
FIG. 3 is a functional block diagram of an interactive art marketplace system, according to one illustrated embodiment.

FIG. 3 is a functional block diagram of an interactive art marketplace 300, according to one illustrated embodiment. Shown are an art gallery host entity 302, and art gallery affiliate entity 304, another affiliate entity 306, and a consumer 308. The art gallery host entity 302, and art gallery affiliate entity 304, another affiliate entity 306, and consumer 308 may, for example, have corresponding networked computer systems such as those described above with reference to FIG. 1 and FIG. 2. However, the physical location of such computer systems under control of each entity may be in various locations with, or remote from, the various physical business locations, office headquarters, or retail centers associated with each entity. The art gallery host entity 302 is an entity that provides art information and opportunities to view online (and possibly also in person) particular art objects to the consumer 308. The art gallery may also sell, rent, or lend on a trial basis, the particular art objects to the consumer, for example, through the online interactive art marketplace 310. The affiliate art gallery 304 and other affiliate 306 may work in cooperation with and is directed by the art gallery host entity 302 in providing the services described herein. Examples of the other affiliate 306 may include, but are limited to, art dealers, art experts, artists, studios, art schools and universities, professors, critics, art communities and organizations, governmental agencies, museums, and art auction houses or other retail centers. There may be one or more art gallery affiliates 304, other affiliates 306, and consumers 308 and the system is not limited to the particular embodiment shown in FIG. 3.

Also shown are various online activities and services provided and enabled by the networked computer systems of the art gallery host entity 302 and possibly the art gallery affiliate 304 and other affiliate 306. These include a guided public art session or auction 312, self-directed viewing and browsing 314 and a private purchase enabling session 316. The guided public art session or auction 312 may be a session completely open to the public in which no invitation or user authentication is required in order for users to participate. More typically, participation in the guided public art session or auction 312 will be limited in some manner with respect to the number and identity of particular users participating in the session. For example, electronic invitations may be sent to a selected group of individuals or entities, and a limited number of slots or "seats" provided. The number of available slots or "seats" may be significantly less than the number of electronic invitations sent. Thus, these "public" sessions may not be open to the general public, but rather to a public of one or more art galleries. In contrast, the private sessions may be limited to a single individual or entity from the art galleries' public. Participation in the private purchasing enabling session 316 may be limited to a salesperson representative or other agent of the art gallery entity or affiliate and a single consumer 308. A consumer includes a single individual consumer or multiple individuals representing a single art purchasing entity. For example, the private purchasing enabling session 316 may include a salesperson or other art gallery representative and a particular consumer 308 who was previously participating in the guided public art session 312 and is ready to purchase or learn about purchasing or trial period options for a particular art object presented during the guided public art session or auction 312. In one embodiment, a consumer 308 is able to participate in any one of these activities remotely via a Web site provided by the art gallery host entity 302 which includes the online interactive art marketplace portal 310 from which the guided public art session or auction 312, self-directed viewing and browsing 314 and a private purchase enabling session 316 may be directly or indirectly accessed. For example, some of the sessions or activities may require the consumer 308 to have an account with (i.e., be a member of) the online interactive marketplace 300, and thus the consumer 308 would use their Web browser to go to the online interactive art marketplace portal 310 to create the account and receive member and login credentials, such as a user name and password, and then log on through online interactive art marketplace portal 310. After logging on, the user may have access to various services and activities such as signing up or making a reservation for a guided for a guided public art session or auction 312 and/or the private purchase enabling session 316. Alternatively, the user may directly enter such a session if a spot is available once logged on. The user also may or may not need to be logged on to access the self-directed viewing and browsing 314.

In one embodiment, the self-directed viewing and browsing 314 may include Web services to provide the consumer 308 a variety of images, video, and or audio data related to art objects and corresponding information such that the consumer may determine whether they are interested in the particular art object. If the user determines they are interested they may indicate this to the art gallery host entity 302 through the online interactive art marketplace portal 310 via a user interface feature of the interactive art marketplace portal 310 (e.g., by using an input device such as a mouse, touch screen, keyboard etc.) that automatically communicates to the art gallery host entity 302 the identification of the particular art object and the identification of the member if logged in.

The consumer 308 may also choose to enter a private purchasing enabling session 314 through the online interactive art marketplace portal 310 in which the consumer, a guest of the consumer (or perhaps both the consumer 308 and consumer's guest) may participate in a multimedia online private conference with a salesperson or representative regarding a particular art object or artist. This private purchase enabling session 316 may include, but is not limited to: live video conferences; live chat sessions; online slideshows or video presentations; 3-D presentations, partial or full control of a client's or consumer's display, computer system, or peripheral devices to provide such presentations or information; file sharing; combined telephone and live Web conferences; text messaging; emailing; telephony; and other synchronous or asynchronous bi-lateral or multi-lateral communications over the Internet or other communications, satellite, or telecommunications networks or systems. However, typically, the session includes a two-way or multi-lateral conference, wherein each participant has their connection un-muted, enabling synchronous open communication between the participants. In one embodiment, the audio of the session may be partially or fully provided over an IP connection between the participants, e.g., using Voice over IP (VoIP) technologies, or, alternatively, over other telecommunications networks in order to preserve more bandwidth over the IP connection for images and/or video being shared during the session. The consumer and art gallery host entity 302 may be able to selectively configure and customize the private purchase enabling session 316 to fit particular needs and circumstances. For example, the consumer may want to view an actual art object through live streaming video on the Web in a variety of real environments at the art gallery host entity 302 location, but may not want or need the art gallery location 312 to be able to see the consumer 308. In such a case, the consumer 308 or art gallery host entity 302 may be able to configure a setting through the online interactive art marketplace portal 310 to customize the private purchase enabling session 316 such that the art gallery host entity 302 cannot see the consumer 308 during the video conference.

Also, during the online private purchase enabling session 316, although the consumer 308 may have received the specifications regarding the size of a particular art object, they may not appreciate the size relative to other familiar objects, or how the art object would appear next to various objects in their home or office or as hung on a wall. In addition, the consumer 308 may have particular items in their home or office next to which they would like to see what art objects of various sizes would look like. Thus, the consumer 308 may participate in an interactive presentation during the private purchase enabling session 316 where the salesperson or other agent of the art gallery host entity 302 may present in real time on the Web to the consumer 308 an image of the particular art object to scale next to or in relation to a variety of other familiar reference items of which the consumer is likely to know the relative size. The salesperson or other agent of the art gallery host entity 302 may also select different art objects in different size categories to show next to or in relation to a particular familiar reference item so that the consumer 308 can appreciate the size of various art objects next to the particular reference item. There also may be one or more art objects displayed to scale with one or more reference items at one time. Before or during the private purchase enabling session 316, the user may also provide (e.g., over email, multimedia message service, network file-sharing, or other file transfer protocol) certain images (e.g., wall, furniture, floor, carpet), and information indicating their relative or approximate size, next to which the consumer would like to see the art object. The art gallery host entity 302 salesperson or other agent may then display online the particular art object to scale next to the image of the reference item communicated by the consumer 308. Further details regarding such an interactive and customized experience are described with reference to FIG. 5 below.

Also, the consumer may want to see what a particular art object would look like hanging on the wall in their home or office. During the private purchase enabling session 316, the consumer may take a digital picture of the actual location in which they would like to see the art and communicate the picture to the art gallery host entity 302 through the online interactive art marketplace portal 310, using, or in combination with, a variety of communications channels (e.g., in a multimedia message from their cellular telephone or other mobile device, email, network file-sharing, or other file transfer protocol). The one or more server computing systems of the art gallery host entity 302 may then digitally place an image of the particular art object, to scale, in various areas in the picture, and adjust the image of the art object for the particular angle of view as determined from the communicated picture or other provided input. Further details regarding such an interactive and customized experience are described with reference to FIG. 7 below.

If a consumer desires to purchase, rent or have a particular art object for a trial period, the transaction may be partially or totally completed online through the online interactive Web portal. For example, the user may electronically indicate a trial period selection for a particular art object via a Web interface of the online interactive art marketplace portal 310. Once the selection is received, the consumer's credit card account or other credit account (e.g., with the online interactive art marketplace 300 or other entity) or prepaid account will either be authorized or charged for the full purchase price of the art object and the art object will be crated and shipped or marked for pick-up by the consumer 308. If after the trial period, the consumer wants to return the art object, they may do so in the crate provided. Once received in proper condition by the art gallery host entity 302, other applicable art gallery affiliate 304 or other affiliate 306, the credit card or other applicable account of the consumer 308 may be credited for the full amount or some lesser amount. The consumer's identifying information such as credit card number, bank account number, billing address and shipping address may be pre-loaded into an online order or selectable by the consumer to be pre-loaded via a member account and profile management system of the online interactive art marketplace portal 310 to increase the speed and convenience of the ordering process.

Other consumer information may be stored such as purchase history, art objects viewed, liked or disliked, demographic data, survey information, etc. to make customized manual or automated art suggestions or automated targeted online art event advertisements or notices. The collective consumer data may be analyzed and mined to detect art market trends, conditions and further improve the online interactive art marketplace 300 to provide relevant information and art products to the consumer 308. Such analysis and/or consumer data may be shared with affiliates.

The above processes and other like transactions may be completely automated under control of the online interactive art marketplace 300 systems described herein. For example, the exact physical location of each art object may be tracked by electronic devices such as radio frequency identification devices (RFID) affixed to the art objects or by scanned machine-readable symbols (e.g., barcodes). Once an order is placed, and the consumer's card is automatically charged, the online interactive art marketplace 300 system may prepare shipping documents and alert the particular gallery, studio, warehouse or other location at which the art object is stored so that it may be shipped to the correct location. All may be accomplished automatically with little or no marked human effort.

The guided public art session or auction 312 may be a guided multimedia presentation in which multiple parties can participate through the online interactive art marketplace portal 310. In some embodiments, the guided public art session or auction 312 may include or be a live auction conducted online involving participants in a variety of locations including at the live location and/or remote locations. In one embodiment, some or all participants are consumers 308 that are registered members of the online interactive art marketplace 300. The consumer 308 first reserves a "seat" at the guided public art session or auction 312 through any variety of communication channels described herein through which their membership may be authenticated. The consumer may then receive a link via email, a code, or other electronic ticket which they use to electronically enter the guided public art session or auction 312 through the online interactive art marketplace portal 310. The participants of the guided public art session or auction 312 are then presented with a variety of information about particular art objects or artists by at least one session leader who may be an agent of the art gallery host entity 302 or other art expert, and may be given opportunities to interact with the agent(s) or expert(s) during the guided public art session or auction 312. The session being led by a person knowledgeable about the art being presented provides for a smooth, professional and effective operation of the session and avoids session participants becoming confused or unable to have a chance for equal participation. The guided public art session or auction 312 may include, but is not limited to: live video conferences; live chat sessions; online slideshows or video presentations; 3-D presentations, file sharing, combined telephone and live Web conferences; text messaging; emailing; and other synchronous or asynchronous bi-lateral or multi-lateral communications over the Internet or other communications channels, satellite communication systems, telecommunications systems, or other networks or systems. However, typically, the session includes a two-way or multi-lateral conference, wherein each participant has their connection un-muted, enabling synchronous open communication between the participants. In one embodiment, the audio of the session may be partially or fully provided over an IP connection between the participants, e.g., using Voice over IP (VoIP) technologies, or, alternatively, over other telecommunications networks in order to preserve more bandwidth over the IP connection for images and/or video being shared during the session.

Figure 4:
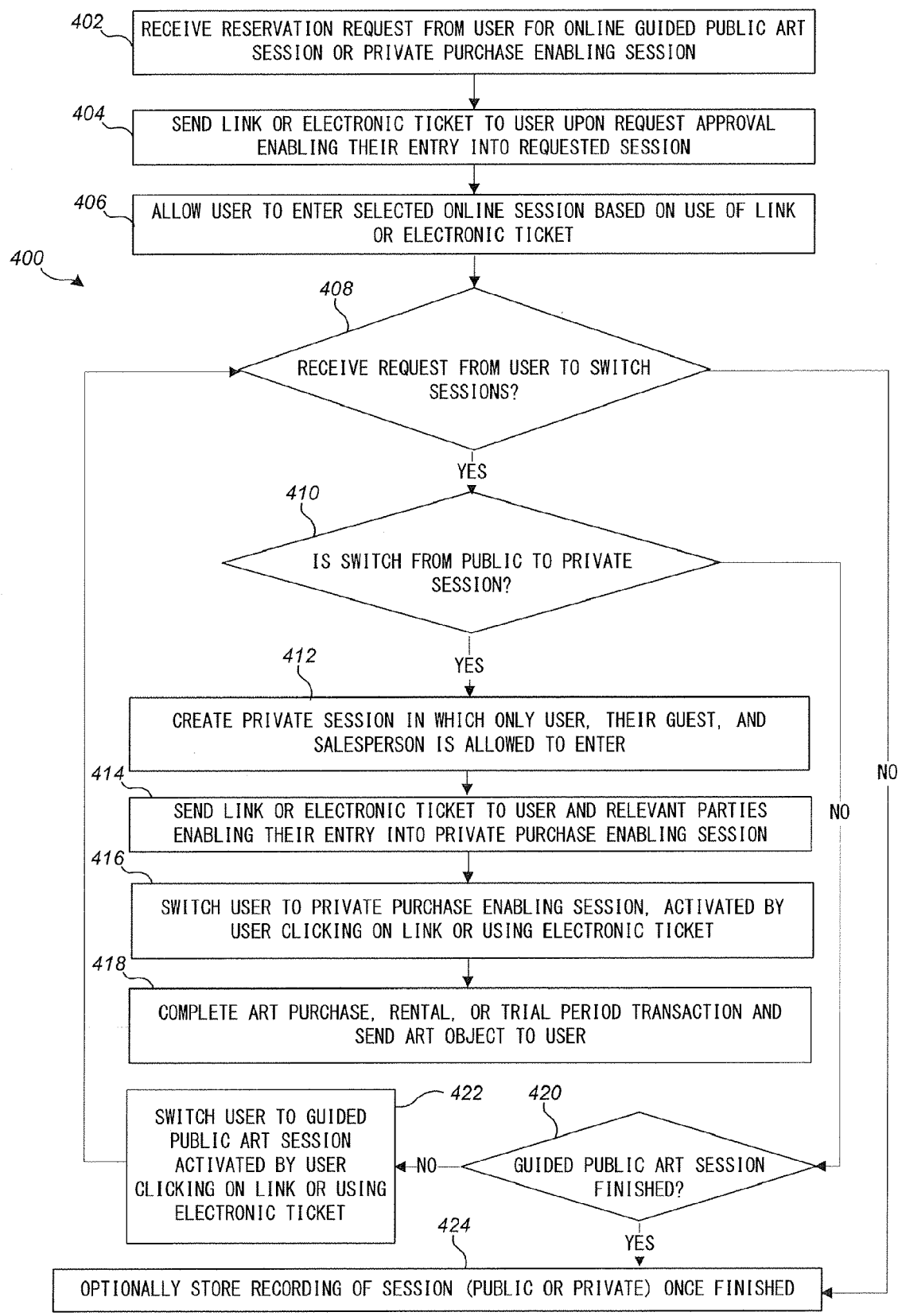
FIG. 4 is a flow diagram showing a method of providing online art sessions, according to one illustrated embodiment.

In one embodiment, if a consumer 308 is currently participating in a guided public art session or auction 312 and desires to move to a private purchase enabling session 316, or is currently participating in a private purchase enabling session 316 and desires to move to a currently happening guided public art session or auction 312, the consumer may do so seamlessly (e.g., by following particular links or providing particular information to or through the online interactive art marketplace portal 310), as described in more detail with reference to FIG. 4 below. In one embodiment, the consumer 308 is allowed to freely move between the self-directed viewing and browsing 314, the guided public art session or auction 312, and the private purchase enabling session 316. In other embodiments, there may be certain restrictions between movement between the various activities and sessions which may be selectable by the art gallery host entity 302 and implemented, monitored and enforced by the systems of the online interactive art marketplace 300 based on a variety of factors including, but not limited to: whether the consumer 308 is a member of the online interactive art marketplace 300; the consumer's membership level or membership status; the exact identity of the consumer 308; whether the consumer has completed a current purchase or other transaction; the consumer's spending history; the consumer's transaction history with the art gallery or art gallery affiliate 304, or other affiliate; the consumer's credit rating; whether the consumer has been issued a reservation or electronic ticket for a particular online session or activity; or whether there is a spot available in the guided public art session or auction, etc.

Also, in various embodiments particular features, functionality and customizations provided via the online interactive art marketplace portal 310 described herein as being available as part of a particular guided public art session or auction 312, private purchase enabling session 316, or the self-directed viewing and browsing 314 may be controlled by the consumer 308, art gallery host entity 302, art gallery affiliate 304, or other affiliate 306 as is selectable by and in the discretion of the art gallery host entity 302. For example, in some alternative embodiments, the customized functionality described herein of enabling the consumer 308 to view particular art objects next to particular reference items and view the art object within a picture provided by the consumer 308 of a potential environment in which the art object is to be placed may be provided in the self-directed viewing and browsing session 314. This is such that the consumer 314 may participate in such a customized experience without assistance and have control over the session. The ability to selectively provide such self-help features and options may be provided by a configurable management system of online interactive art marketplace 300 as implemented by a computer system controlled by the art gallery host entity 302.

FIG. 4 shows a method 400 of providing online art sessions, according to one illustrated embodiment. The method starts at 402, in which a reservation request may be received from a user for an online guided public art session or a private purchase enabling session. The reservation request may be electronically or manually communicated in a variety of manners and over a variety of different communication channels including email, Web page entry, text message, telephone, mail, fax, chat message, instant message, etc., through or outside the online interactive art marketplace portal 310 (shown in FIG. 3). For example, a user may log onto the online interactive art marketplace portal 310, in which their membership has already been authenticated by the logging on, and then go to a specific section or select (e.g., click) on a particular link within the online interactive art marketplace portal 310 indicating that the member would like to make a reservation for the guided public art session or auction 312. Alternatively, the member can send an email to a particular email address associated with the art gallery host entity 302 or online interactive art marketplace 300 from an email address associated with their membership registration.

At 404, a link or electronic ticket is sent to the user upon approval of the request enabling their entry into the requested session. The approval may be based on a number of different criteria including, but not limited to: whether there is a spot available in the selected session, whether the user is a member of the online interactive art marketplace 300; the user's membership level or membership status; the exact identity of the user; whether the user has completed a current purchase or other transaction; the user's spending history; the user's transaction history with the art gallery or art gallery affiliate, or other affiliate; the user's credit rating; etc. In some embodiments, the link or electronic ticket may be sent as an electronic invitation without having received any initial request. The electronic ticket, for example, may include an entry or access code for the session or other data with which the identification of the user or electronic ticket may be verified. At 406, the user is allowed to enter the selected online session based on use of the link or electronic ticket. In some embodiments, a request and use of a link or electronic ticket need not be received to allow the user to enter the session as long as the user has verified their membership by logging on the online interactive art marketplace portal 310.

At 408, it may be determined whether a request has been received from a user to switch sessions. If not, then at 424, optionally, once the session in which the user is currently participating finishes, a recording of the session may be automatically stored. The stored recording may be used for a variety of different purposes including, but not limited to: providing other authorized users (e.g., other members, artists, students, studios, affiliates, etc.) the opportunity to view the session at a later time online, provide feedback online to the person or people that guided the session, provide a record of particular transactions that occurred during the session, provide the participants of the session an opportunity to review the session online, provide recorded sessions online as additional products for consumers, provide the recorded session as educational material to schools and organizations, etc.

If it has been determined at 408 that the user has requested to switch sessions during their current session, then it may be determined at 410 whether the request to switch sessions is from a public to a private session (e.g., from a guided public art session or auction 312 to a private purchase enabling session 316 as described above). This may occur, for example, when a user sees a particular art object that the user is interested in during the public session and may want to purchase or learn more about that particular art object.

If it is determined at 410 that the request to switch sessions is from a public to a private session, then a private session is created at 412 at which point the user may exit the public session resulting in the session ceasing to be remotely displayed or otherwise provided to the user while other users continue to participate in the public session. In some embodiments, the public session may be a session completely open to the public in which no invitation or user authentication is required in order for users to participate, or limited in some manner with respect to the number and identity of particular users participating in the session. Participation in the private session may be limited to a salesperson representative or other agent of the art gallery entity or affiliate and a single consumer. A consumer includes a single individual consumer or multiple individuals representing a single art purchasing entity. For example, in one embodiment, only the user and a salesperson are allowed to enter or participate in the session. In another embodiment, one or more guests of the user are also allowed to enter. The private session may be created online while the public session is occurring and be entered via the online interactive art marketplace portal 310 or other online application. For example, a virtual chat room or meeting room associated with the private session may be presented on the user's display in another Web page or window, or another frame within the same Web page as that of the public session in which the user is currently participating. At 414, a link or electronic ticket may be sent (e.g., sent via text, email, Web chat, other electronic message, etc.) to the user and other relevant parties enabling their entry into the private purchase enabling session. The user may enter by selecting (e.g., clicking) on the link or entering a code or password online to activate or enter the private session presented on the user's display in another Web page or window, or another frame or area within the same Web page or window in which the public session is being displayed. In other embodiments, the user may be already identified and/or authenticated if they are currently logged on to the online interactive art marketplace portal 310 when requesting to enter the private session, and they may be automatically allowed to enter the private session by selecting (e.g., clicking on) an icon, button, link, window or other object presented to them on their display while logged on the interactive art marketplace portal 310.

At 416 the user may be seamlessly switched to the private purchasing enabling session. This switching may be a seamless handoff to the private session as the user may continue to participate in the public session while waiting for their request switch to be allowed and the private session to be created by the system of the online interactive art marketplace portal 310. For example, a virtual chat room or meeting room associated with the private session may be presented on the user's display in another Web page or window, or another frame within the same Web page as that of the public session in which the user is currently participating. Once the request to switch is approved and user has been properly authenticated (e.g., by selecting (e.g., clicking) on the link sent, providing a password or pass code, using an electronic ticket, or by virtue of the user sending the request while being logged on to the online interactive art marketplace portal 310), the user may switch to the private session by selecting (e.g., clicking) on a virtual chat room or meeting room associated with the private session. The window, frame or Web page of the virtual chat room or meeting room of the public session from which the user switched is then automatically closed after the switch to the private session is completed. In some alternative embodiments, the user may be allowed to continue to participate either actively or passively in the in public session while also participating in the private session, in which case the applicable window will not be closed. Also, management functionality of the online interactive art marketplace portal 310 may allow particular users privileges or access credentials to monitor, view and/or participate in any session (public or private) currently happening via the online interactive art marketplace portal 310. For example, a session leader may have multiple displays, windows, or frames controlled by one or more computers showing a variety of sessions happening concurrently or that are overlapping in time.

The private purchasing enabling session may be performed in a variety of different matters and include a variety of different online functionality in order to enable the user to experience and learn about a particular art object or objects as described above and in more detail below. At 418, an art purchase, rental or trial period transaction may be completed within the private purchasing enabling session and the particular art object may be sent (or arrangements made to send the art object) to the user. This process may also be automated as described in more detail above. The process then returns to 408 where it may be determined whether a request is received from the user to switch to another session (e.g., return to the same public art session from which they switched or continue on to another private session, etc.).

If it is determined at 410 that the request to switch sessions is not from a public to a private session (i.e., from a private session to a public session), then the user may be seamlessly handed off in the other direction to the public session if the session is not finished and there is still a spot available. The user may want to switch from a private to a public session, for example, when the user becomes aware of the public session currently happening online and they have either completed a transaction in their private session as described above, or are no longer interested in continuing their private session and would rather join or re-join one of the guided public art sessions currently happening. If the guided public art session to which the user wants to switch is not finished, then once the switch is approved, at 422 the user may be switched to the guided public art session activated by the user selecting (e.g., clicking) on a sent link, using a provided password or pass code, or other authentication as described above in a similar manner to that of switching the user from the public session to the private session. The process then continues on to 408 where it may be determined again whether there is a request from the user to switch sessions (e.g., switch to a private session or to a different public session). However, the particular manner in which the user switches sessions and the functionality allowing the user to switch sessions in the particular manner may vary and is not limited to the embodiment shown and described with reference to FIG. 4.

Figure 5:
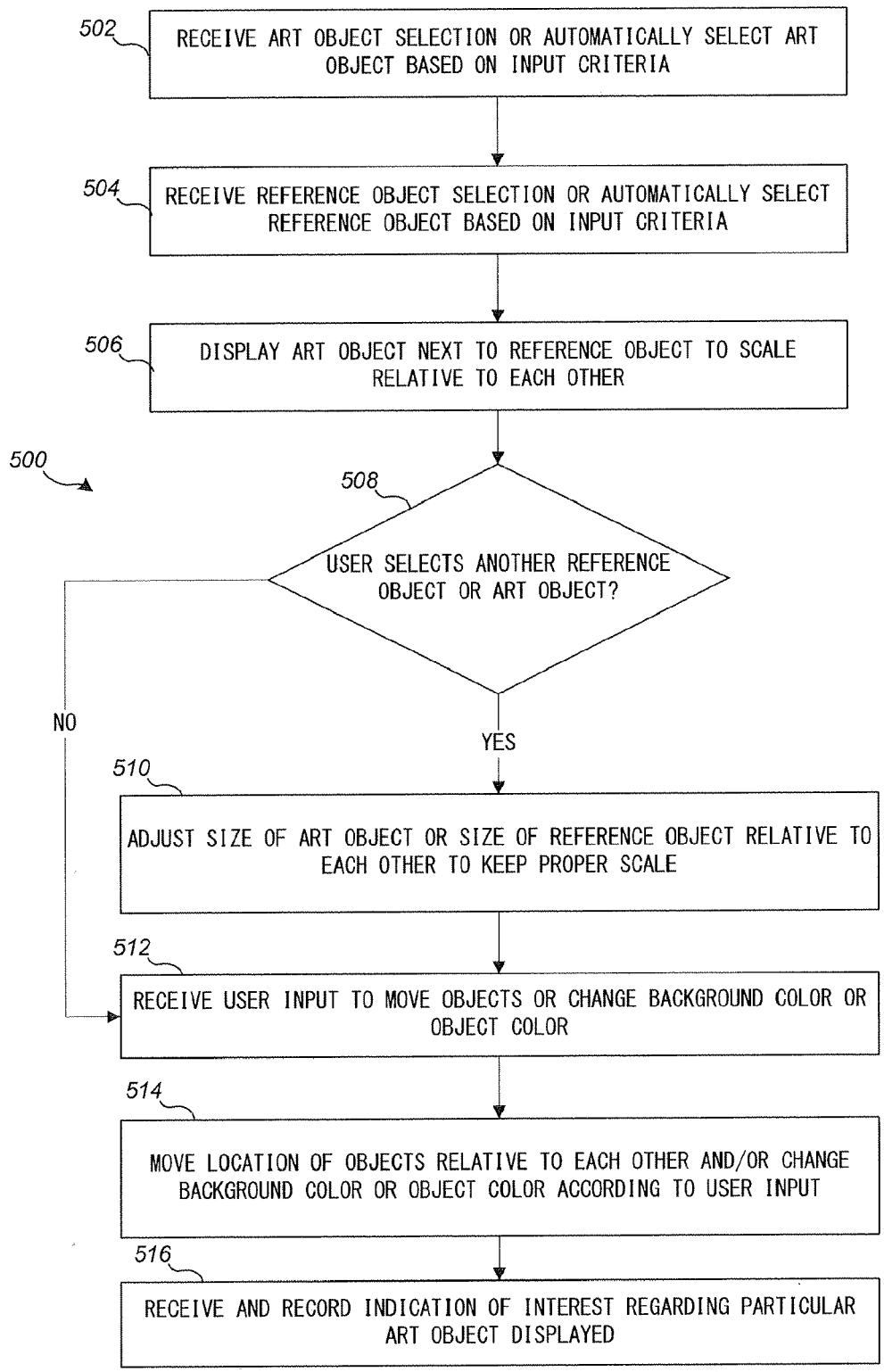
FIG. 5 is a flow diagram showing a method of presenting pieces of art online, according to one illustrated embodiment.

FIG. 5 shows a method 500 of presenting pieces of art online, according to one illustrated embodiment. In various alternative embodiments, the method described below and other methods described herein below may be performed by and/or controlled by any user or system of the online interactive art marketplace 300 and may be performed as part of, or in conjunction with, any of the features and functionality described herein of the online interactive art marketplace 300. These include, but are not limited to the private purchase enabling session 316, self-directed viewing and browsing 314, and guided public art session or auction 312, etc. Thus the term "user" described herein may refer to the consumer 308, or a salesperson, agent or representative of the art gallery host entity 302, art gallery affiliate 304 or other affiliate 306 or even artist. However, in some embodiments, the control and/or participation of the method below and other methods described herein may be selectively restricted to certain users, systems or sessions, such as, for example, restricted to the private purchase enabling session 316 and performed by the online interactive art marketplace system under the control and supervision of at least one session leader who may be a salesperson, other agent, or art expert of the art gallery host entity 302, art gallery affiliate 304 or other affiliate 306. The session being led by a person knowledgeable about the art being presented provides for a smooth, professional and effective operation of the session and avoids session participants becoming confused or unable to have a chance for equal participation. As described above in further detail, the process below may be performed over the Web or other communications network via the online interactive art marketplace portal 310.

At 502, an art object selection is received or an art object is selected for a particular user based on criteria input by the user, a salesperson or other agent. The art object selection may also be made automatically based on previous input gathered by the system of the online interactive art marketplace 300. The input and criteria may be related to a variety of different data and factors including, but not limited to: indications of interest made by the user, previous purchase history of the user, previous online session participation by the user, demographic information of the user, the user's budget, etc.

At 504 an image of a reference object next to which to display an image of the art object selection is electronically received or a reference object image is automatically selected based on particular input criteria. The input criteria may include, but is not limited to: size of the selected art object, size of objects in the environment in which the art object is to be placed, particular known reference objects in the environment in which the art object is to be placed, color and other characteristics of known reference objects in the environment in which the art object is to be placed, etc. For example, there may be a number and variety of sample reference objects from which to select categorized by size, color, décor style, commonality, etc. Generally, the reference objects may be those types of common household objects that are familiar to the user and having a size with which the user would be familiar (e.g., a light switch, a door, common furniture pieces, etc.). The user may also provide their own images of reference objects to use and optionally include measurements and/or other scale data of the provided reference object.

At 506, the art object is then electronically displayed to scale next to or in other relation to the reference object on the user's display. The salesperson, agent or representative of the art gallery host entity 302, art gallery affiliate 304 or other affiliate 306, and in an alternative embodiment, the consumer 308, may move, adjust or change the reference object and/or the art object on the display by use of an input device such as a mouse, touch screen, trackball, etc. Such movement will also be shown on the display of the consumer 308. In some embodiments, two or more art objects of interest may be displayed simultaneously or concurrently in relation to one or more reference objects. Such may be implement by scaling each of the art objects with respect to a given reference object. Where two or more reference objects are employed, such may be scaled with respect to one another, either as stored in the system or just prior to scaling or display of the art objects. The art objects may then be respectively scaled with respect to the reference objects, which inherently scales multiple art objects with respect to one another. Alternatively, the art objects may be scaled with respect to one another, then scaled to with respect to the reference object(s).

For example, at 508 it is determined whether the user has selected another reference object or art object. If it has been determined that the user has selected another reference object or art object, at 510 the size of the art object image and/or the size of the reference object image (or new reference object image) is adjusted relative to each other to keep the proper scale. The entire art object and entire reference object image may be displayed together, or portions of the objects' images may be display together. Also, the user may zoom in or out to view either of the objects in greater or less detail, but the scale is kept accurate between the objects during any such manipulation of the object images.

At 512 user input may be received to move objects, change the color of the background in front of which the objects are displayed or an object's color. Then at 514 the location(s) of the object(s) is changed, and/or the background color is changed according to the received user input. Such may be particularly useful if the consumer's display has been color calibrated.

At 516, an indication of interest may be received (e.g., from a consumer user) regarding a particular art object being displayed. This indication of interest may be electronically communicated in a variety of manners, such as, for example, by the user selecting (e.g., clicking or pushing on) an icon or checkbox next to the icon on the user's display comprising a thumbnail representation of the art object of interest. Additionally, this indication of interest may be used for future reference in making decisions regarding transactions of the user and electronic interactions with the user regarding recommendations of other art objects or artists to the user. The indication of interest may also be an indication that the user wants to purchase or otherwise complete a transaction regarding the art object of interest. In which case, an order process may be automatically initiated for that art object of interest.

If it has been determined at 508 that the user has not selected another reference object or art object, then the process may continue on to 512 wherein user input is received as described above to adjust the current objects being displayed.

The screen prints shown in FIGS. 6A-6I are example user interfaces that may be generated by one or more of the computer systems described herein and appear on a user's display in accordance with various embodiments and methods described herein for the online interactive art marketplace 300. However, a variety of other user interfaces and controls of various types are contemplated and may be employed with the methods and processes described herein.

Figure 6A:
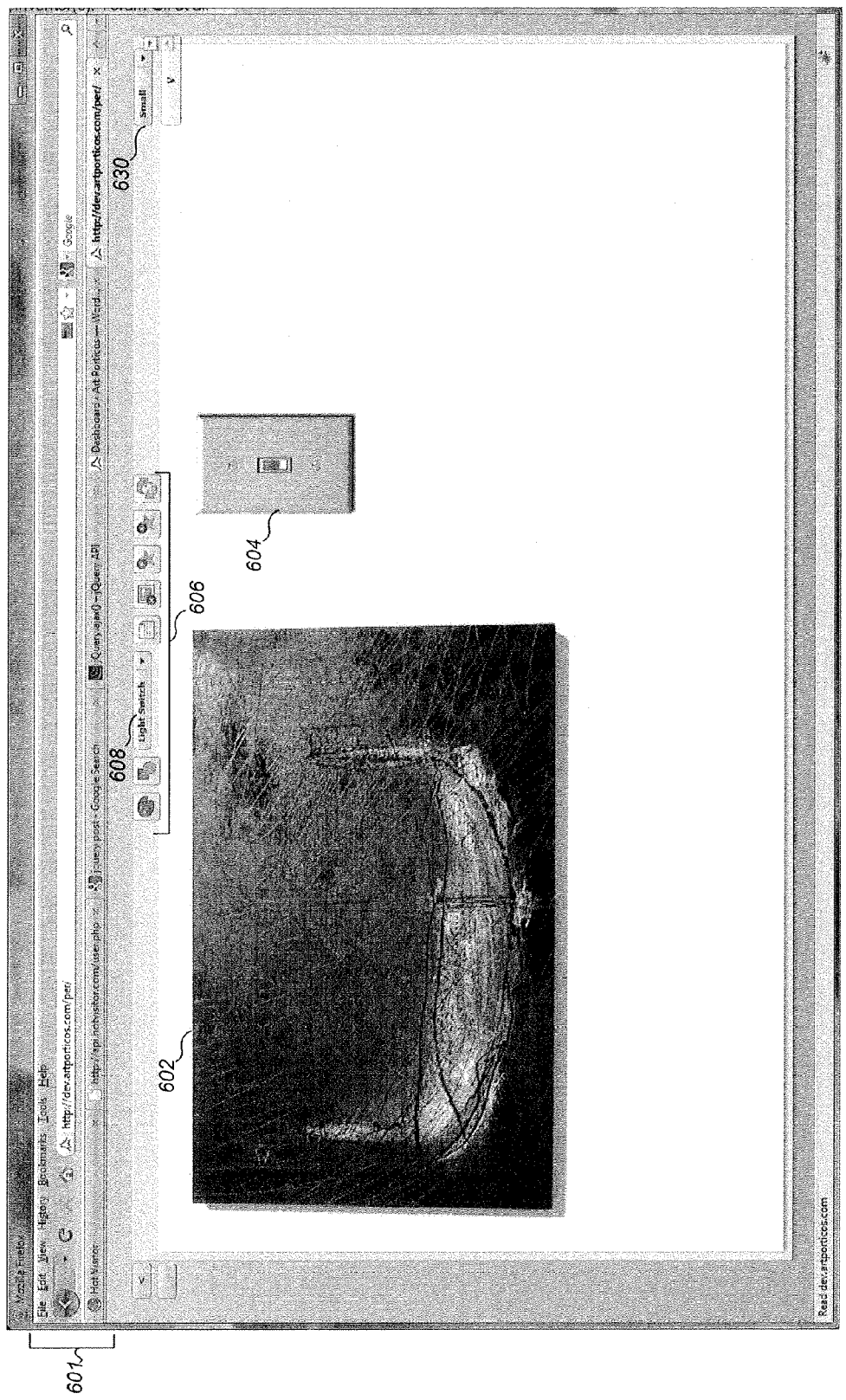
FIG. 6A is a screen print of a Webpage showing a first art object to scale next to a first reference object, according to one illustrated embodiment.

In the screen print example 600 provided in FIG. 6A, the first art object 602 is a painting of a first size and the reference object is a wall light switch 604 of a smaller size than the first art object 602. For example, the screen print 600 includes one or more tool bars, such as tool bars 601, 606 with user selectable icons and/or menus to control operation of a browser application program executed by the art gallery computing system 102, affiliate art gallery host computer system 262, affiliate computer system 264 and/or consumer computer system 266 (FIG. 2). As can be seen in FIG. 6A, one may determine the relative size of the first art object 602 by comparing an image of it visually with a familiar reference object of a commonly known size such as the light switch image 604. Note, the first reference object 604 and first art object 602 are displayed as if they were approximately the same distance away from the viewer.

User interface, menus, devices and controls 606, 608, 630 may be used to manipulate, change, and/or adjust the first art object 602 and first reference object 604. In particular, shown across the top of the screen print 600 is a set of user controls 606 to change a variety of characteristics of the images and background including color, view, etc. Also included in the set of controls 608 is a reference object drop down menu 608, which may be used to select different reference objects by name. The reference object drop down menu 608 also may display the name of the currently selected reference object (e.g., "light switch") as shown in FIG. 6A. Shown in the upper left hand corner of the screen print 600 is an art object size category drop down menu 630 which may be used to select an art object by size category. The art object size category drop down menu 630 may also display the name size category of the currently selected art object (e.g., "small") as shown in FIG. 6A.

Figure 6B:
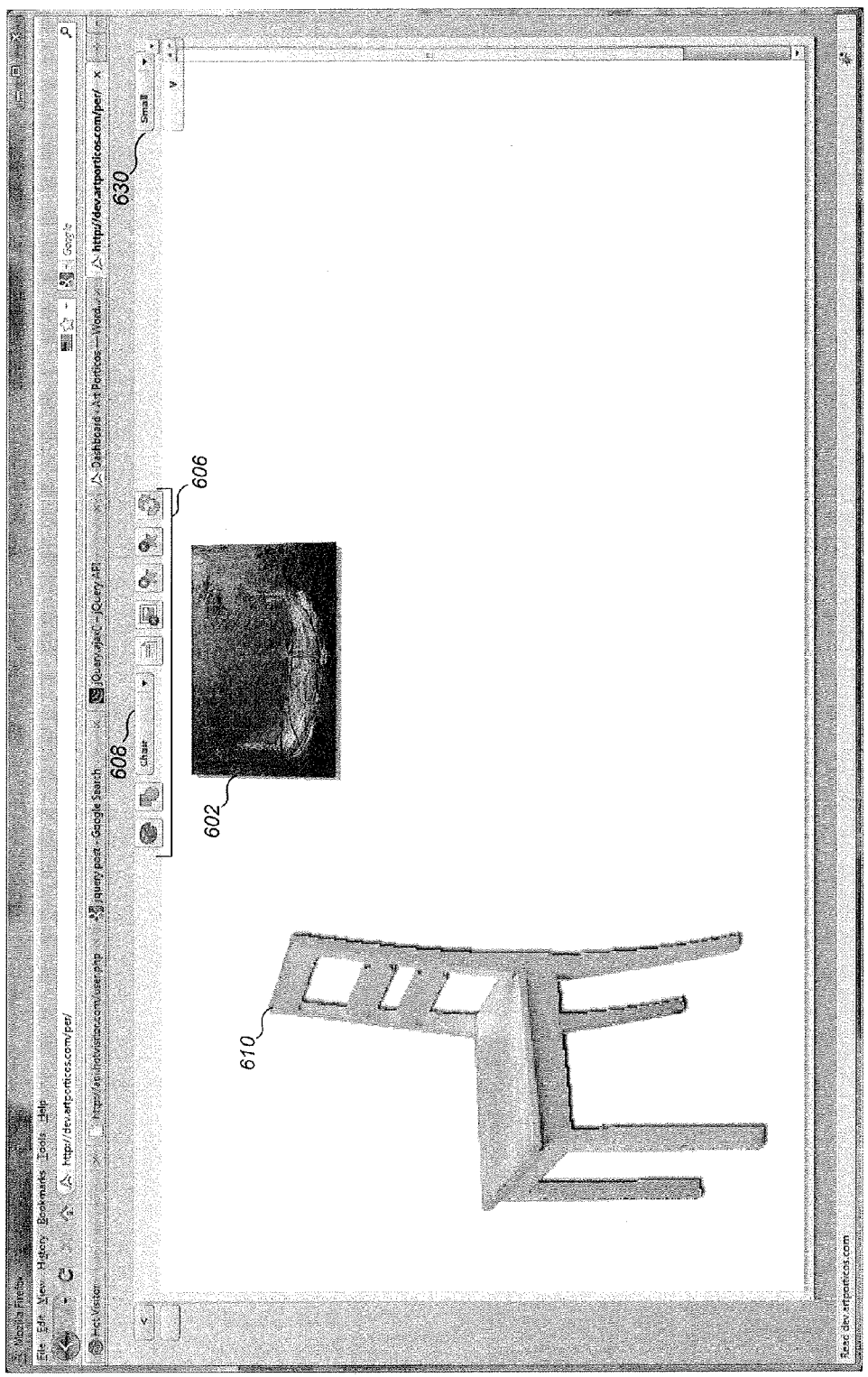
FIG. 6B is a screen print of a Webpage showing the first art object to scale next to a second reference object, according to one illustrated embodiment.

FIG. 6B is a screen print 608 of a Webpage showing the first art object 602 to scale next to a second reference object 610, according to one illustrated embodiment. In FIG. 6B, the second reference object 610 is a chair. As can be seen in FIG. 6B, the first art object 602 is now displayed smaller since the chair 610 is significantly larger than the light switch of FIG. 6A and the view is zoomed out to display both the chair 610 and first art object 602.

Figure 6C:
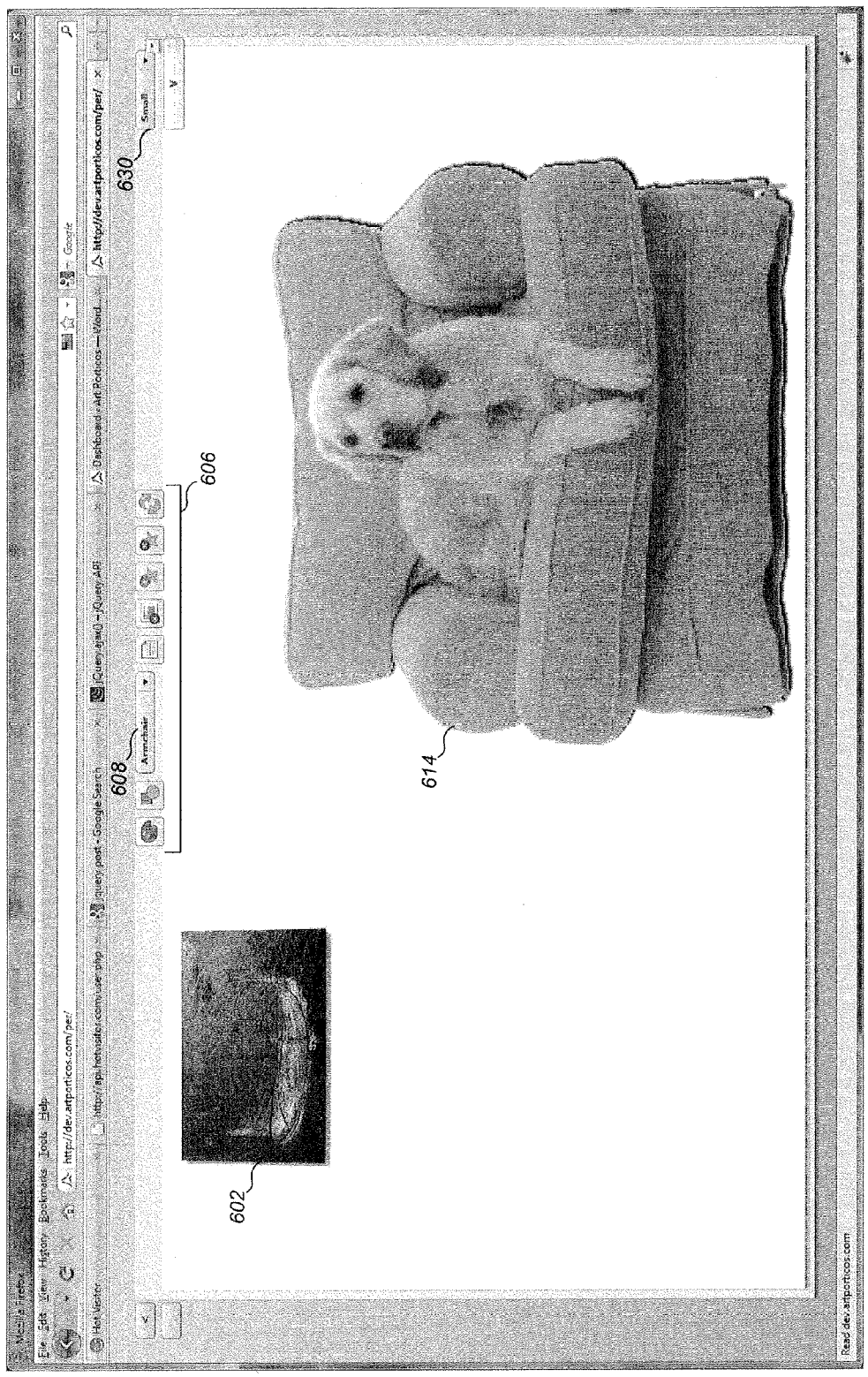
FIG. 6C is a screen print of a Webpage showing the first art object to scale next to a third reference object, according to one illustrated embodiment.

FIG. 6C is a screen print 612 of a Webpage showing the first art object to scale next to a third reference object, according to one illustrated embodiment. In FIG. 6B, the second reference object 610 is a larger armchair. Note however, the armchair 614 is displayed to the right of the first art object 602, as the user may select and drag the images of the art objects and reference objects in two dimensional space to change their positions on the display relative to each other while keeping the apparent distance between the viewer and the reference object and art object the same. In alternative embodiments, full three dimensional renderings of the art objects and reference objects may be rotated. However, in order to keep the same perceived proper scale between both objects, reference object 614 and the art object 602 are displayed as if they were always approximately the same distance away from the viewer (i.e., in the same plane perpendicular to the line of sight of the viewer) as the user rotates each object or zooms in or zooms out to view the objects in greater or less detail. For example, if a user zooms in on art object 602, the view of reference object 614 will also be zoomed in at the same rate and to the same extent.

Figure 6D:
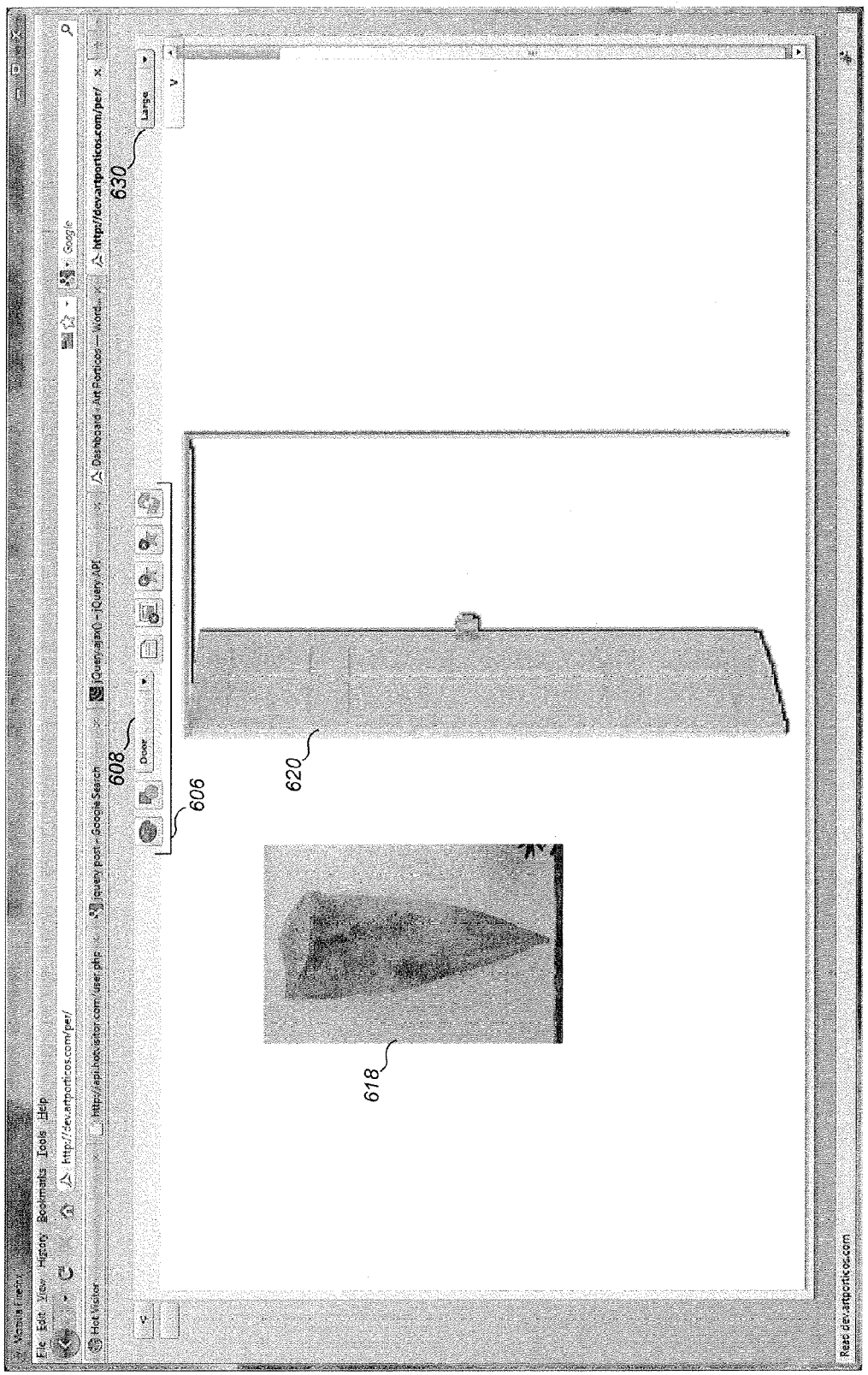
FIG. 6D is a screen print of a Webpage showing a second art object to scale next to a fourth reference object, according to one illustrated embodiment.

FIG. 6D is a screen print 616 of a Webpage showing a second art object 618 to scale next to a fourth reference object 620, according to one illustrated embodiment. As shown in FIG. 6D, the second art object 618 is a larger painting and belongs to the large size category of art objects as is displayed in the drop down menu 630. The fourth reference object 620 is a door next to which the second art object 618 appears to be hanging.

Figure 6E:
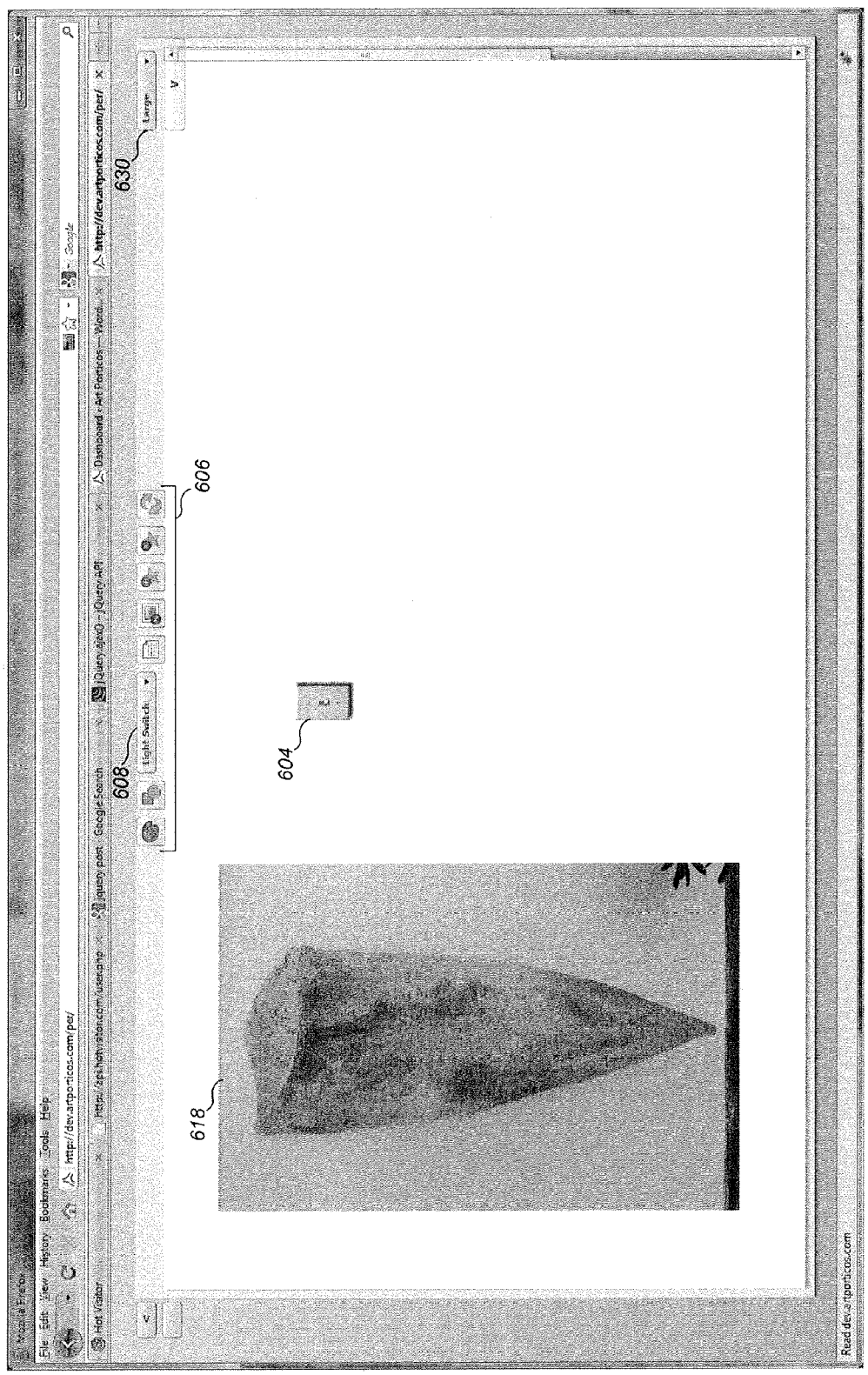
FIG. 6E is a screen print of a Webpage showing the second art object to scale next to the first reference object, according to one illustrated embodiment.

FIG. 6E is a screen print 622 of a Webpage showing the second art object 618 to scale next to the first reference object 604 (e.g., the light switch), according to one illustrated embodiment. Note the view of the second art object 618 is zoomed in further than shown in FIG. 6D due to the smaller size of the light switch reference object 604 and appears quite large next to the light switch 604.

Figure 6F:
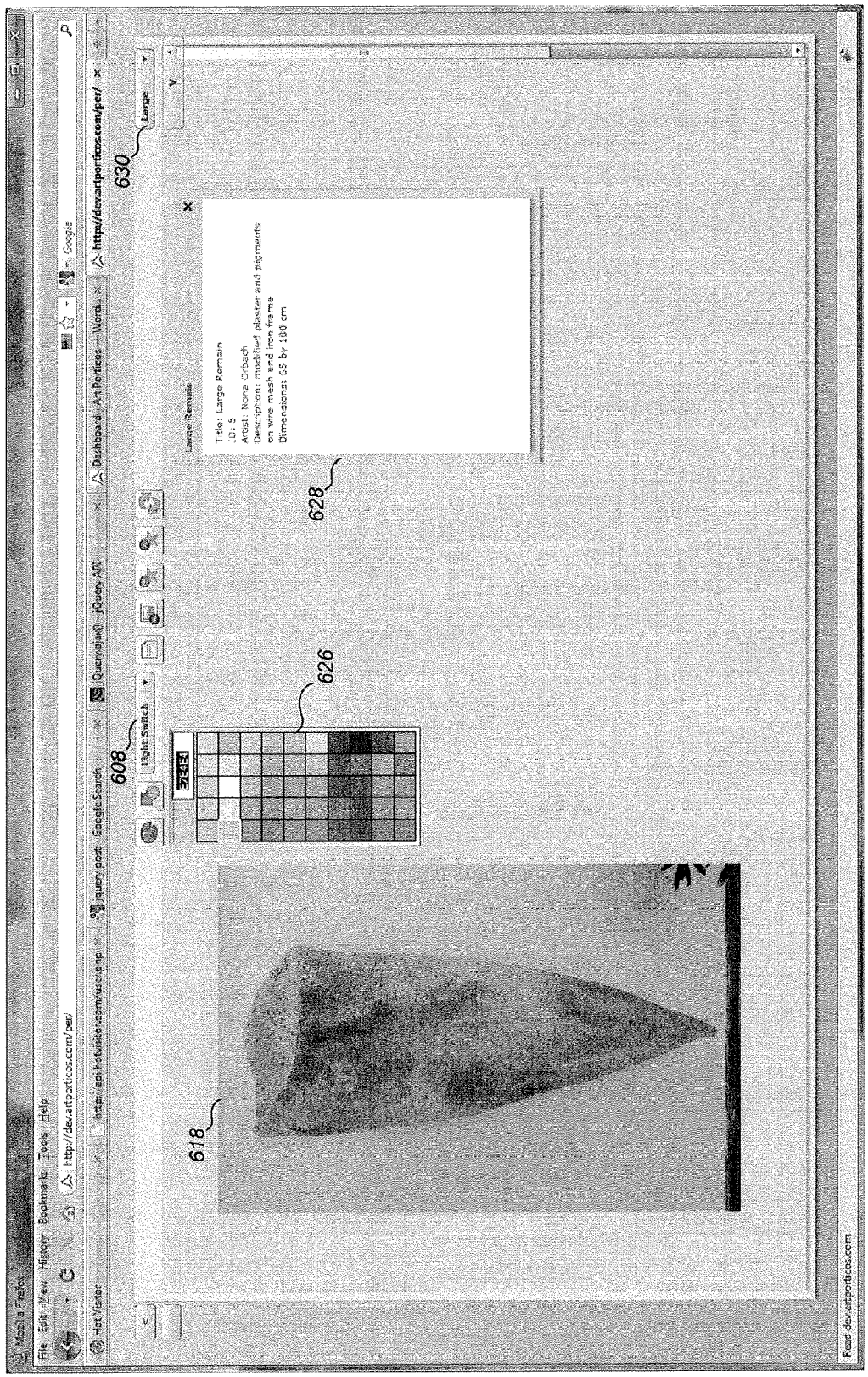
FIG. 6F is a screen print of a Webpage showing the second art object and an interface for selecting a background wall color from a palette of colors, according to one illustrated embodiment.

FIG. 6F is a screen print 624 of a Webpage showing the second art object 618 and an interface 626 for selecting a background wall color from a palette of colors, according to one illustrated embodiment. To change the background color, a user may click on any color within the palette shown in the interface 626. Also shown is a window 628 including various information regarding the art object 618 displayed including art object title, artist name, verbal description and dimensions. Other or different information may optionally also be included including, but not limited to: price, age of art object, background, further artist information and background, etc. The window 628 may be activated by any variety of keyboard strokes or controls on the Webpage in which the image of the art object 618 appears including buttons, links or menu items.

Figure 6G:
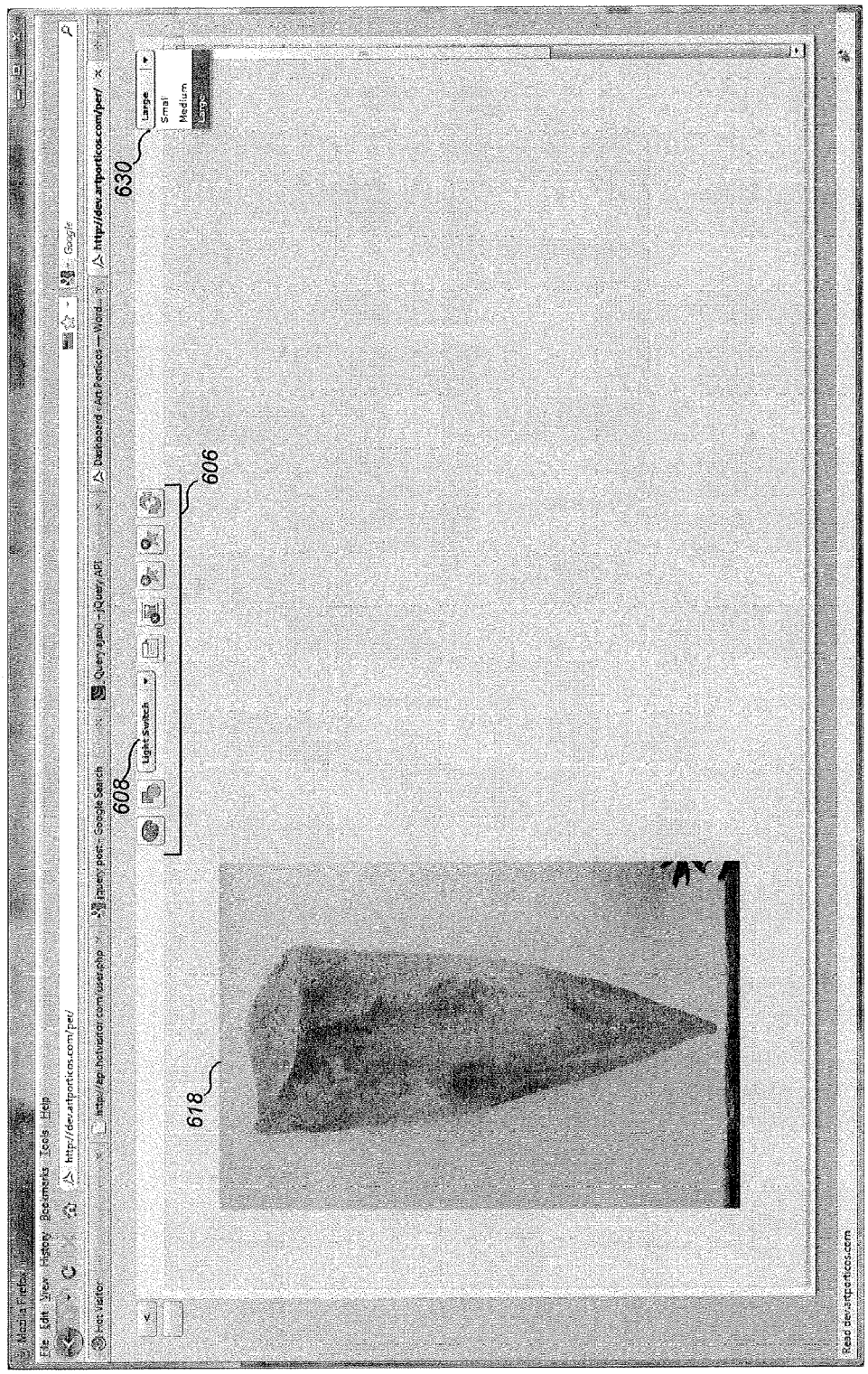
FIG. 6G is a screen print of a Webpage showing the second art object and an interface for selecting a size category of art pieces, according to one illustrated embodiment.

FIG. 6G is a screen print 632 of a Webpage showing the second art object 632 and the art object size category drop down menu 630, according to one illustrated embodiment. Once activated, the art object size category drop down menu 630 displays the different size categories (e.g., small, medium and large) of art objects. In other embodiments, other size categories (e.g., extra small or extra large) identified by particular dimension ranges, and other categories or genres of art may also be displayed.

Figure 6H:
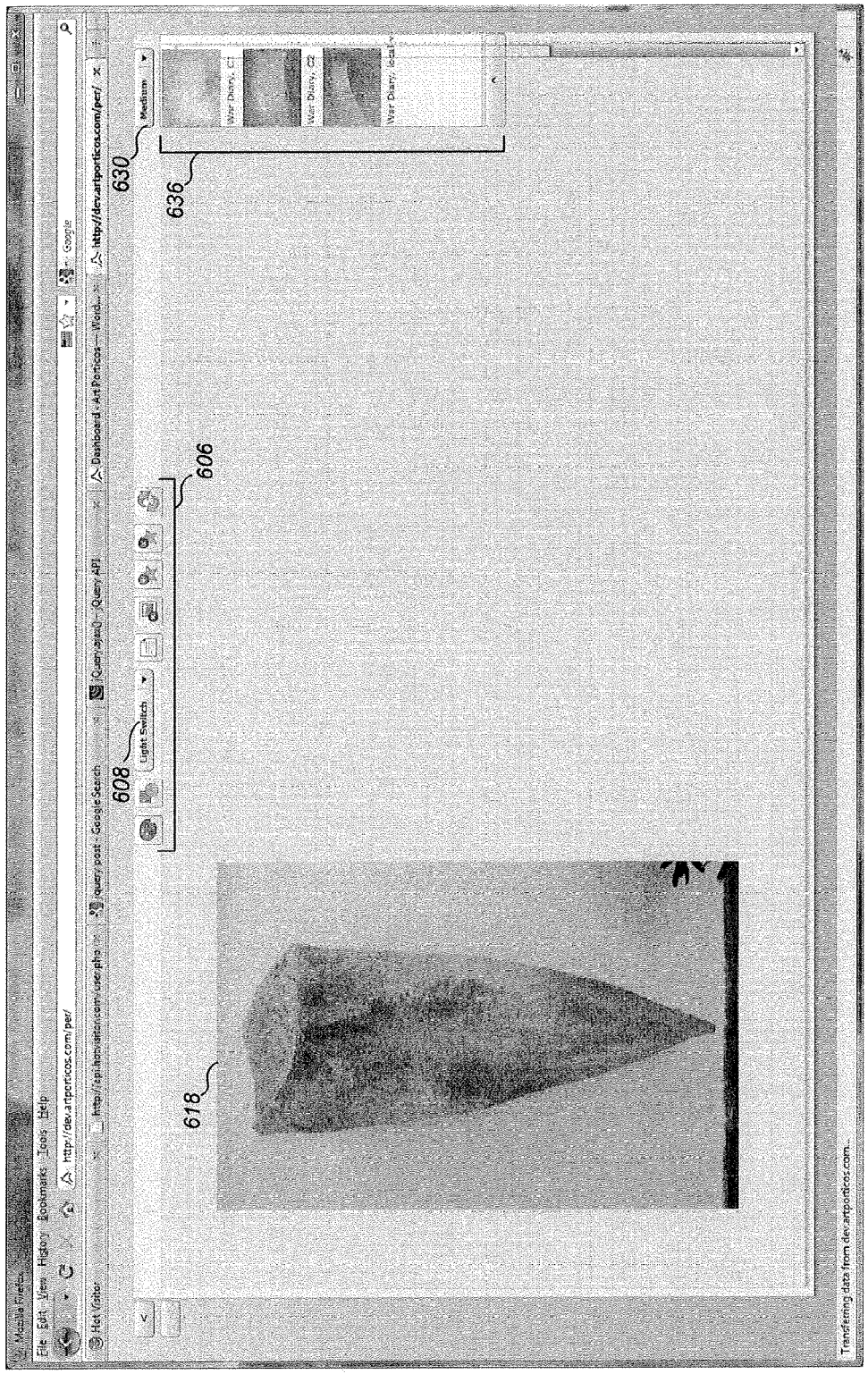
FIG. 6H is a screen print of a Webpage showing the second art object and a group of thumbnail representations of art pieces in a selected medium size category, according to one illustrated embodiment.

FIG. 6H is a screen print 634 of a Webpage showing the second art object 618 and a group of thumbnail representations 636 of art pieces in a selected medium size category, according to one illustrated embodiment. As shown in FIG. 6H, once a user selects a particular size category (e.g., from the drop down menu 630) a group of thumbnail representations 636 of art objects in the selected size category will appear.

Figure 6I:
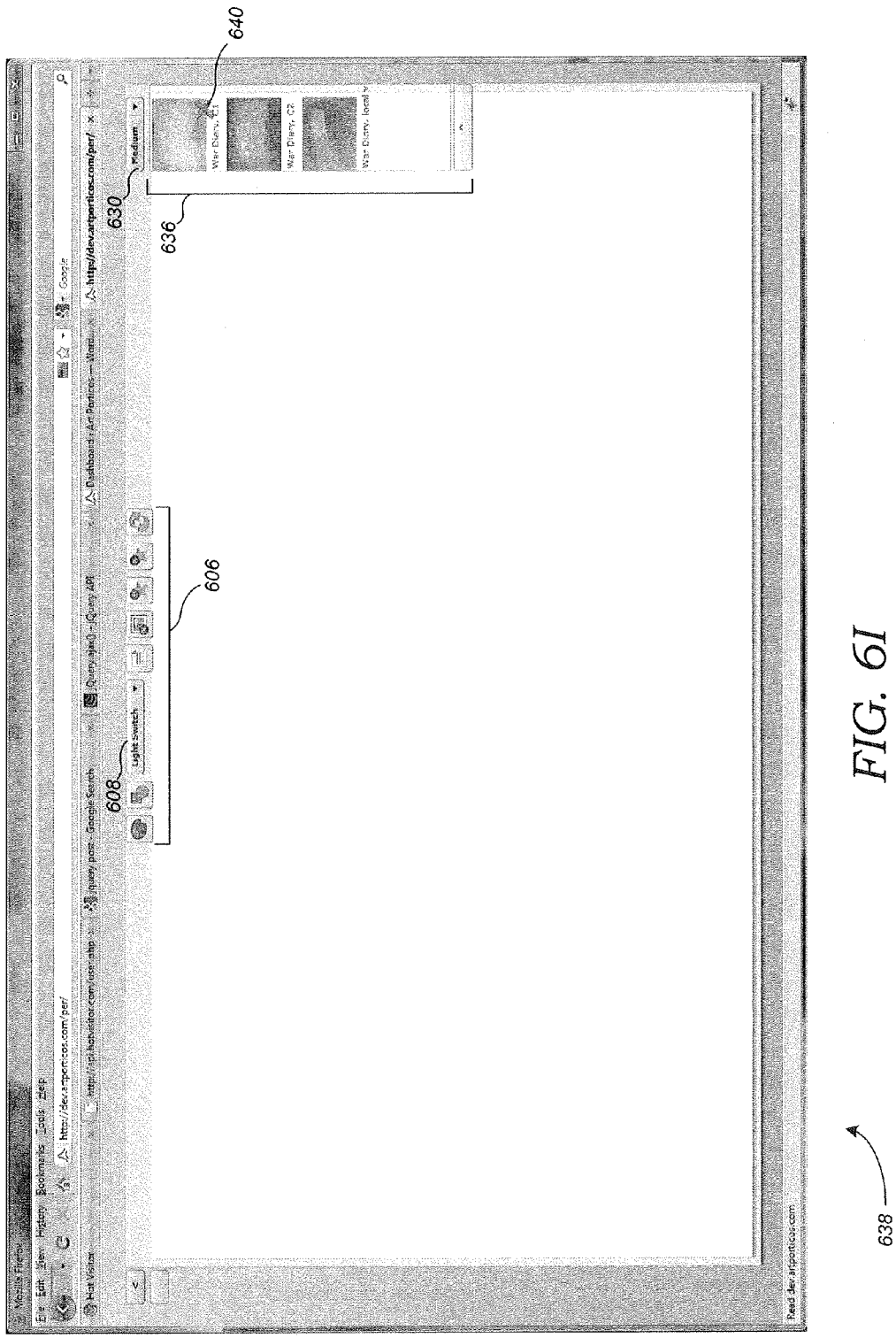
FIG. 6I is a screen print of a Webpage showing the group of thumbnail representations of FIG. 6H of the art pieces in the selected medium size category and showing a mark on one of the thumbnails indicating disinterest in the art object represented by the thumbnail, according to one illustrated embodiment

FIG. 6I is a screen print 638 of a Webpage showing the group of thumbnail representations 636 of FIG. 6H of the art objects in the selected medium size category and shows a mark on one of the thumbnails 640 indicating disinterest in the art object represented by the thumbnail, according to one illustrated embodiment. This indication may be made by the user in a variety of ways, including, for example, the user selecting (e.g., clicking) on the particular thumbnail image which may then bring up a menu of items to select from indicating level of interest or disinterest. A mark may then be put on the thumbnail image 640 identifying the level of interest or disinterest. In one embodiment, the art object may optionally be automatically removed from the display or from available art objects in the group for the particular user according to the level of disinterest, etc. Additionally, in an alternative embodiment, this indication of disinterest or interest may be used for future reference in making decisions regarding transactions of the user and electronic interactions with the user regarding recommendations of other art objects or artists to the user. The indication of interest may also be an indication that the user wants to purchase or otherwise complete a transaction regarding the art object of interest. In which case, an order process may be automatically initiated for the particular art object of interest.

In one embodiment, particular size categories and other types of categories (e.g., styles) of reference objects may be available to be selected by a user in a similar manner to the size categories of the art objects. For example, when a particular size category is selected using a reference object size category drop down menu (not shown), the available reference objects (e.g., titles, or thumbnail images of the available reference objects) shown in the reference object drop down menu are those of the selected size category. The desired reference object to be displayed may then be selected from the reference object drop down menu.

Figure 7:
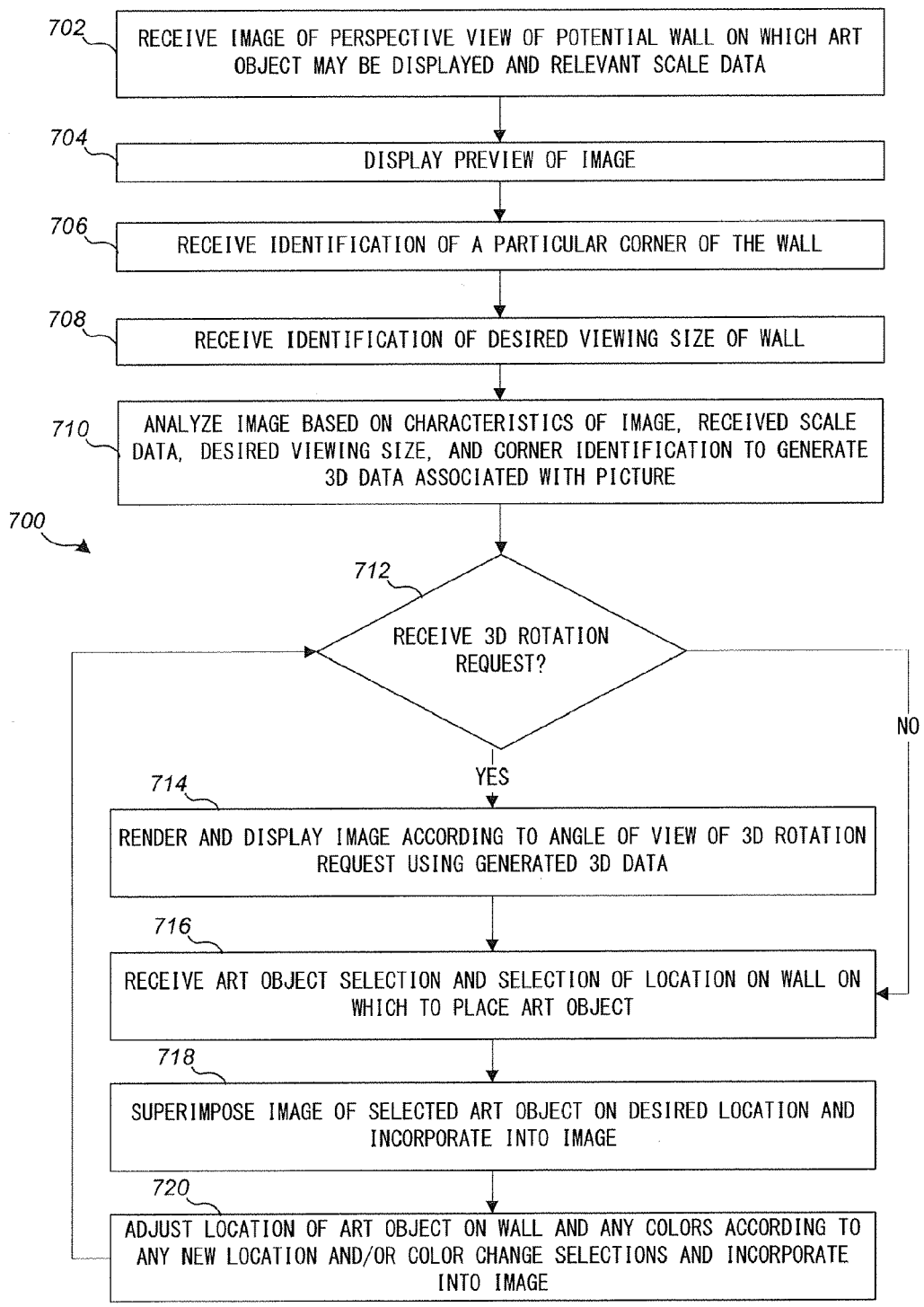
FIG. 7 is a flow diagram showing a method of digitally presenting pieces of art online on a provided picture of a perspective view of an area in which the art is to be placed, according to one illustrated embodiment.

FIG. 7 is a flow diagram showing a method 700 of digitally presenting art objects online on a provided digital picture of a perspective view of an area in which the art is to be placed, according to one illustrated embodiment. At 702 a picture is received of a perspective or isometric view of a potential wall or other rectangular object on which, or next to which an art object may be displayed. Also received may be dimension or other scale data associated with items in the picture. For example, the scale data may include a measurement of an item within the picture or scale data with respect to the actual size of the picture itself and/or or items within the picture, etc. Also, if a reference item is included in the received picture that has a known standard size or known exact or approximate size, (e.g., a person, light switch, door, soda can, piece of paper, pen or pencil, etc.) receiving the scale data may be optional because the scale may be determined or estimated based on the known exact or approximate reference object size. The picture and associated scale data may be received electronically via a number of different methods and protocols including, but not limited to: a file upload function of a Web page of the online interactive art marketplace portal 310 or other Web page, email, multimedia message service (MMS) cellular telephone message, file transfer protocol (ftp), network file sharing, peer-to-peer file sharing, or other file transfer methods or protocols. For example, the picture may be received by a consumer 308 via an upload function over the Web during a private purchase enabling session while the consumer 308 is logged onto the online interactive art marketplace portal 310 with their camera, mobile device, notebook computer or other computing device as described above with reference with FIG. 3 in conjunction with FIG. 1 and FIG. 2.

At 704 a preview of the picture may be displayed. At 706 an identification of a particular corner of a wall within the picture may be received. For example, a user may click (or push when using a touch screen) on a particular corner of the wall shown within the picture resulting in the identification and transmission of grid information identifying the location of the corner of the wall within the picture. At 708 an identification of a particular size or viewing size of the wall within the picture may be received. For example, a user may click on a corner of the wall and then drag the mouse cursor or other input device to a point on the display wherein the distance between the corner and the point on the display indicates either the size of the wall or size of the viewing area on the display in which the wall is to be displayed. In particular, the distance that the user moves the cursor from the corner of the wall in the picture will then indicate how long or wide the wall is in the direction in which the cursor was moved. Alternatively, the distance that the user moves the cursor from the corner of the wall will indicate the size of the viewing area on the display in which the wall is to be displayed. For example, the size of the wall on which the art object is to be placed in the picture may be relatively small compared to other objects in the picture. The distance the user drags the cursor from the corner of the wall in the picture will then indicate how much the system will zoom in on the picture in order to display the wall larger than it appears in the picture.

At 710 the picture is automatically analyzed based on one or more of: the wall or rectangular object corner identification, detected lines, shading, or other characteristics of the picture or items within the picture; extrapolated three dimensional data from the picture; received scale data; desired size of the wall, viewing size of the wall or other rectangular object within the picture, etc. This data may then be used to generate three dimensional data associated with the picture. For example, the relative angle of view of the perspective view the wall or other rectangular object within the provided picture may be automatically determined by detecting the angle or the angles of the lines forming one or more corners of the wall or other rectangular object. This three dimensional data may include x, y, z, coordinate data to automatically create a partial or three dimensional model of the scene of the picture or one or more objects within the picture.

At 712 it is determined whether a three dimensional rotation request is received to rotate the three dimensional (3D) model of the scene of the picture or one or more objects within the picture. If no rotation request is received, then at 716 an art object selection is received as well as a selection of a location on or next to the wall or other rectangular object on which to place the art object. If it is determined such a rotation request has been received, then at 714 the picture (or a reference wall or other rectangular object to be placed in or on the picture) is first rendered and displayed, using the generated 3D data, according to the angle of view of the 3D rotation request.

At 718 the image of the selected art object is then superimposed on the desired location on the 3D model of the scene of the picture or one or more objects within the picture. The 3D model may be based on one or more physical characteristics (e.g., dimensions, colors, lighting) of a real physical environment, such as a room or wall. The image of the art object may also have 3D data associated with it so that it may be rotated to match the determined angle of view of the of the scene of the picture or one or more objects within the picture when superimposed on the picture. For example, if the art object is a painting that a consumer would like to see hanging on a wall shown within the provided picture, then the image of the painting may be automatically adjusted (e.g., rotated and adjusted for size according to perceived distance from the viewer) to match the angle of view of the wall and particular location on the wall on which the painting is to be hung. Other adjustments to the image of the art object may be made to fit the environment and scene of the provided picture such as color and shading, etc.

At 720, the location of the art object on or next to the wall or other object may be adjusted as selected by the user (e.g., by the user using a mouse to drag and drop the image of the art object to a different location). Adjustments to colors and shading may also be automatically made according to and in conjunction with the selected location. The method may then continue on to 712 to handle further adjustments and changes according to user selections and customizations.

Figure 8:
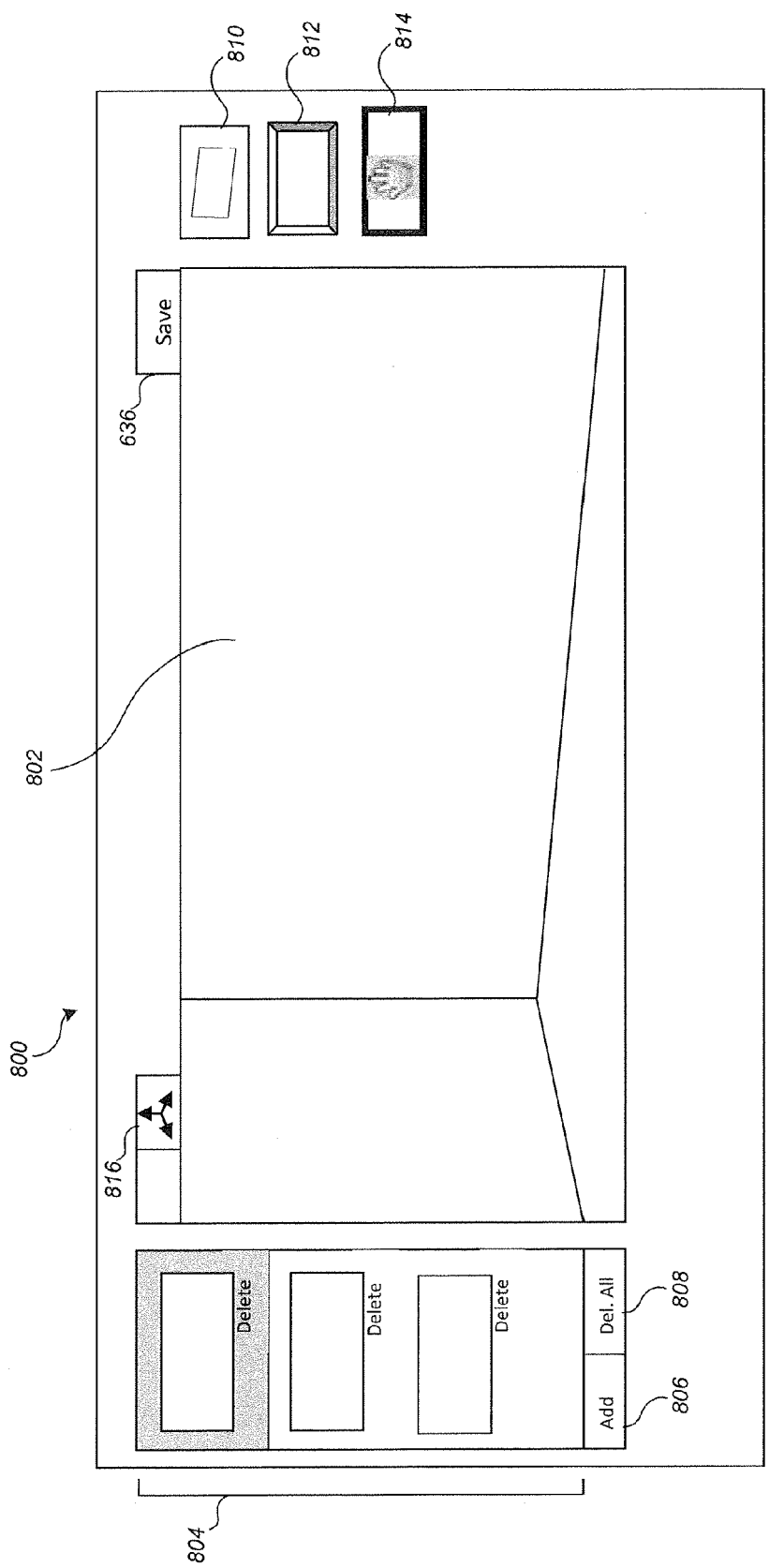
FIG. 8 is a diagram of a user interface of an application for digitally presenting art objects online on a provided picture of a perspective view of an area in which the art is to be placed, according to one illustrated embodiment.

FIG. 8 shows an interface 800 including a window for editing uploaded pictures 802, a menu for previewing and selecting uploaded pictures 804, an add picture user control 806, a delete picture user control 808, a toolbar including a wall initial location control 810, an add art object user control 812, and a wall movement user control 814. Also shown are a wall 3D rotation user control 816, and a save button 636. The user may add pictures by activating the add picture user control 806 to upload them. The method described above and as shown in FIG. 7 may be implemented with and/or used in conjunction with the user interface 800 and associated application described below.

Figure 9:
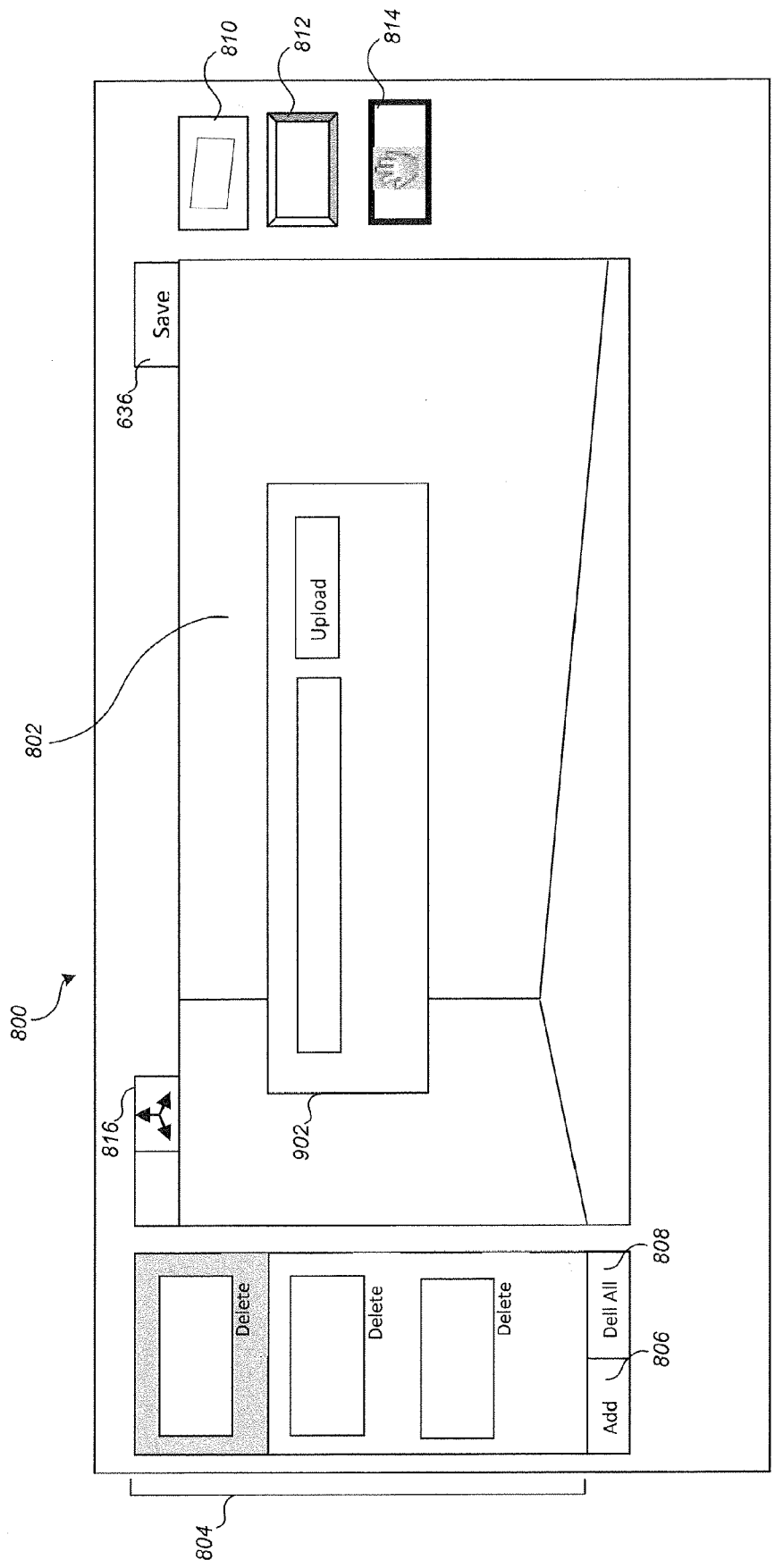
FIG. 9 is a diagram of a user interface of FIG. 8, including an upload feature for the picture, according to one illustrated embodiment.

FIG. 9 shows the interface 800 including an upload feature 902 for the picture, according to one illustrated embodiment. Once the add picture user control 806 is activated, the upload feature 902 will appear (e.g., a picture upload dialogue box). The user may activate the upload feature 902 to select particular files from a local or remote file storage device to upload to the application. A preview of the uploaded picture will then appear in the menu for previewing and selecting uploaded pictures 804. The user may then select the particular desired picture from the menu for previewing and selecting uploaded pictures 804, which will then appear in the window for editing uploaded pictures 802.

Figure 10A:
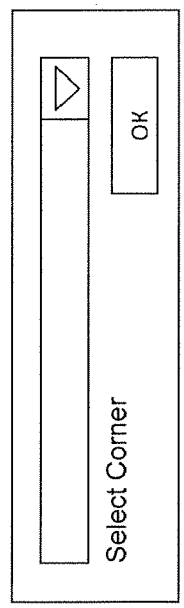
FIGS. 10A and 10B are diagrams of two alternative user interface features of the application of FIG. 8 for identifying particular corners of walls in the picture of the area in which the art is to be placed.
Figure 10B:
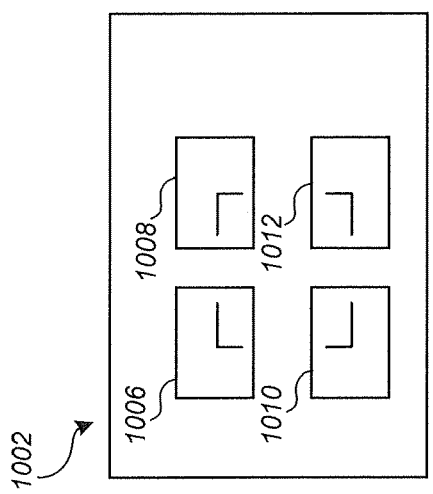

FIGS. 10A and 10B show two alternative corner selection user interface features 1000, 1002 of the application of FIG. 8 for identifying particular corners of walls or other rectangular objects in the selected picture (or a desired location to include a corner of such a wall or object in the picture). The user may then select a corner of the wall or other rectangular object within the picture (or a desired location to include a corner of such a wall or object in the picture) by activating the wall initial location control 810 and then selecting whether the corner is an upper right, upper left, lower right or lower left corner. For example, this selection may be made by using one of the corner selection user interface features 1000 1002. In particular, corner selection user interface feature 1000 comprises a drop-down menu that includes selections of each type of corner. Alternatively, corner selection user interface feature 1002 comprises an upper left corner button 1006, an upper right corner button 1008, a lower left corner button 1010 and a lower right corner button 1012, each of which may be selected accordingly to select the corresponding type of corner.

The user may then use an input device such as a mouse, trackball or touch screen, etc., to indicate an area within the picture in which the wall or other rectangular object corner is located, or is desired to be initially located. The size of the wall or other rectangular object may also be set during selection of the corner placement by the user dragging the mouse cursor or other input device from the point at which the user desires the corner to a distance in the general applicable direction of the desired length or width of the wall or object. A quadrangle corresponding to the wall or other rectangular object shown within the picture (or desired wall or rectangular object to be placed in the picture) will then be created and displayed on or within the picture having adjustable initial dimensions, color and shading. For example, the quadrangle may be initially transparent or be become transparent after adjustment of location and size of the quadrangle. The location of the quadrangle on the picture may be adjusted by the user activating the wall movement user control 814 and then using a mouse, touch screen, or other input device to drag and drop the quadrangle to the desired location on the picture. The dimensions of the quadrangle may also be adjusted after initial placement on the picture by the user dragging and dropping a particular corner or side of the quadrangle a distance corresponding to the desired increase or decrease in area, width or length.

The user may also rotate the quadrangle in a three dimensional manner using the wall 3D rotation user control 816 to better correspond to the angle of view or perspective of the scene depicted in the picture or existing wall or other rectangular object in the picture being used for reference. Activation of the various user controls to adjust the size, location and rotation of the quadrangle may also cause quadrangle to become non-transparent during such adjustments such that it may be visible during the adjustments. The quadrangle may then return transparent after the adjustments are complete.

In another embodiment, the created quadrangle, or data defining or otherwise associated with the quadrangle, will additionally or instead be used to create 3D data associated with the picture in order to create a partial or full 3D model of the selected picture. The data defining or otherwise associated with the quadrangle may be generated based on the user inputting or otherwise indicating data such as corner placement, size and angle of view (by the 3D rotation of the quadrangle) as described above, or instead (or in combination with the inputted data above) by automatic edge, line and/or shading detection of objects within the picture. The proper perspective may then be computed by determining various angles between the detected edges and lines within the picture.

Figure 10C:
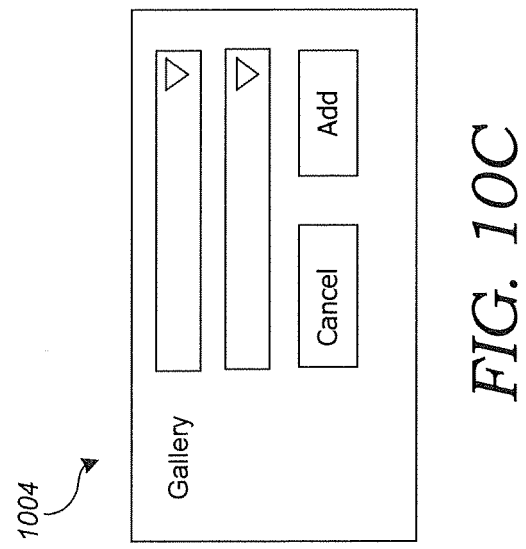
FIG. 10C is a diagram of a user interface feature of the application of FIG. 8 for selecting various pieces of art to display in the picture of the area in which the art is to be placed.

FIG. 10C shows a user interface feature 1004 of the application of FIG. 8 for selecting one or more of various images of art objects to display in the picture. For example, the user may select art objects by activating the add art object user control 812 of FIG. 9, which will then cause user interface feature 1004 to appear having a drop down menu that includes a gallery of available objects from which to select. Once an art object is selected it will appear at an initial location in the picture to scale on or next to the quadrangle (which may be transparent or otherwise integrated into the picture or 3D model of the picture) according to any scale data associated with the picture that was previously received or extrapolated from data associated with the picture. The image of the art object may also have 3D data associated with it so that it may be rotated to match the determined angle of view of the scene of the picture or one or more objects within the picture as indicated by the quadrangle. For example, if the art object is a painting that a consumer would like to see hanging on a wall shown within the provided picture, then the image of the painting may be automatically adjusted (e.g., rotated and adjusted for size according to perceived distance from the viewer) to match the angle of view of the wall (as indicated by quadrangle dimensions) and the and particular location on the wall on which the painting is to be hung. Other adjustments to the image of the art object may be made to fit the environment and scene of the provided picture such as color, brightness and shading, etc.

The systems, devices, and methods described herein may also be applied to other objects and be used for other applications including furniture objects, interior design elements, window dressings, architectural objects and design, etc.

A computer-readable storage medium may store a dynamic image list, which can be mounted separately or in combinations, or removed, and which remains available throughout a current session and future session. The dynamic list may maintain a defined number of selections or combinations, whether objects d' art, walls, furnishings or combinations thereof. The system may provide or implement a gallery-dynamic images list—which can be mounted or removed but remain available. The system may provide or implement the ability to save a session, including the scaled walls and the dynamic artworks list. The system may provide or implement the ability to bring in the dynamic list from one saved session/wall into another session/wall. The system may provide or implement the ability to add thickness/depth to 2D flat artworks—giving them even more natural/real presence on the wall. The system may provide or implement the ability to add from a selection of frames to flat artworks and build it around the art to the correct scale and adding the thickness by having it floating over the wall with an added shadow which is another item on this laundry list. The system may provide or implement the ability to add lighting and direction of lighting relative to the art. The system may provide or implement the ability to add shadows at will. The system may provide or implement the ability to move objects that were photographed with the wall—representing a client's room as part of the process. This may provide a powerful tool for interior designers as well as for us art dealers. The system may be expanded to represent objects d'art with three-dimensional volumes, for instance sculptures, furniture, etc. The two dimensional and three dimensional objects may be represented in a same image.

Any of the above may be provide via an application or applet executing on a mobile or Web enabled handheld computing or communications device, for example a smartphone or tablet device. Applets may be distributed via a central distribution site, for example the "APP STORE"™ operated by Apple.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary art gallery based networked computing system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and other non-transitory computer-readable storage media.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method of providing interactive online sessions for presenting art objects, the method comprising:
   providing remote access to a user to participate remotely in an online session of a first type;
   creating the online session of the first type;
   causing a remote displaying, under control of at least one session leader of the online session of the first type, a number of images of a plurality of art objects to the user during the online session of the first type;
   electronically receiving an indication of interest of the user to participate in an online session of a second type based on an interest of the user in one of the art objects;
   creating the online session of the second type;
   providing remote access to the user to participate remotely, under control of at least one session leader of the online session of the second type, in the online session of the second type that includes as participants the at least one session leader of the online session of the second type and the user;
   during the session of the second type, receiving a selection of an image of the one of the art objects, the one of the art objects being a physical art object, the physical art object having one of more physical dimensions;
   receiving a selection of an image of a first reference object, the first reference object being a physical reference object, the physical reference object having one or more physical dimensions; and
   in response to receiving the selection of the image of the one of the art objects and receiving the selection of the image of the first reference object, electronically causing a displaying in the online session of the second type at least one image that concurrently shows a visual representation of the one of the art objects and a representation of the first reference object in which the visual representation of the one of the art objects and the visual representation of the first reference object are proportionate in size to each other based at least in part on the one or more physical dimensions of the physical art object and the one or more physical dimensions of the physical reference object.

2. The method of claim 1, further comprising:
   remotely switching the user from the online session of the first type to the online session of the second type; and
   keeping active the online session of the first type for the user until the user is switched to the online session of the second type.

3. The method of claim 2, wherein information is remotely provided in a first window on a display of the user corresponding to the online session of the first type and the remotely switching comprises:
   causing a remote displaying a second window on the display of the user corresponding to the online session of the second type;
   discontinuing access to information provided in the first window once the user activates the second window; and
   providing information in the second window related to the online session of the second type.

4. The method of claim 1 wherein the online session of the first type is able to have multiple potential consumers as participants and the online session of the second type is electronically restricted to a particular potential consumer from the online session of the first type.

5. A networked computing system, comprising:
   at least one networked computer, including at least one processor and at least one processor-readable storage medium that non-transitorily stores instructions that when executed by the at least one processor causes the at least one processor to:
   electronically provide access to a user to participate in an online session of a first type;
   receive, from at least one session leader of the online session of the first type, a selection of an image of a first object of interest, wherein the first object of interest is a physical art object, the physical art object having one or more physical dimensions;
   receive, from the at least one session leader of the online session of the first type, a selection of an image of a first reference object, the first reference object being a physical reference object, the physical reference object having one or more physical dimensions;
   in response to receiving the selection of the image of the first object of interest and receiving the selection of the image of the first reference object, electronically cause a display to the user of at least one image that concurrently shows a visual representation of the first object of interest and a visual representation of the first reference object in which the visual representation of the first object of interest and the visual representation of the first reference object are proportionate in size to each other based at least in part on the one or more physical dimensions of the physical art object and the one or more physical dimensions of the physical reference object;
   initiate an online session of a second type responsive to receiving an indication from the user of an interest in the first object of interest;
   limiting access to the online session of the second type to at least one session leader of the online session of the second type and the user;
   receive a selection of an image of a second reference object from the user, the second reference object being a second physical reference object, the second physical reference object having one or more physical dimensions;
   in response to receiving the selection of the image of the second reference object, adjust either a size of the displayed at least one image of the first object of interest or a size of a visual representation of the second reference object such that the visual representation of the first object of interest and the visual representation of the second reference object are proportionate in size to each other based at least in part on the one or more physical dimensions of the physical art object and the one or more physical dimensions of the second physical reference object; and automatically cause a display of the visual representation of the second reference object concurrently in relation to the visual representation of the first object of interest in the online session of the second type.

6. The system of claim 5 wherein the instructions further cause the at least one processor to display the selected first object of interest in the at least one image in a user selected location relative to the first reference object.

7. The system of claim 5 wherein the instructions further cause the at least one processor to:

receive input to zoom in or zoom out a view of the image of the first object of interest or image of the first reference object; and in response to the received input, automatically zoom in or zoom out a view of both the image of the first object of interest and the image of the first reference object the same amount and at the same time.

8. The system of claim 5 wherein the image of the first object of interest or image of the first reference object is a three dimensional image and wherein the instructions further cause the at least one processor to:

receive input to rotate a view of the three dimensional image of the first object of interest or a view of the three dimensional image of the first reference object; and in response to the received input, rotate the view of the three dimensional image of the first object of interest or rotate the view of the three dimensional image of the first reference object.

9. The system of claim 5 wherein the instructions further cause the at least one processor to:

receive an indication of interest regarding the first object of interest; and in response to the received indication of interest, automatically record the indication of interest; and electronically place an order for the first object of interest.

10. A computer-implemented method of providing interactive sessions for presenting objects, the method comprising:

providing access to a user enabling the user's participation in an online session of a first type;

receiving a digital image data that represents an image of a physical place in which an art object of interest may be potentially placed, the physical place having one or more physical dimensions;

receiving a selection, from an image of the art object of interest within the session, the art object of interest being a physical art object, the physical art object having one or more physical dimensions; and within the online session of the first type, digitally superimposing a visual representation of the art object of interest on a visual representation of the physical place to provide at least one image in which a visual representation of a particular physical reference object included in the image of the physical place and the visual representation of the art object of interest are proportionate in size to each other based at least in part on the one or more physical dimensions of the physical art object and the one or more physical dimensions of the physical place and at an exact or approximate angle of view corresponding to an angle of view and perceived distance of the particular physical reference object within the image of the place from a point of view from which the image of the place was taken;

receiving a request from a user to initiate an online session of a second type;

limiting access to the online session of the second type to at least one session leader of the online session of the first type and the user;

receive a selection of an image of a reference object from the user, the reference object being a physical reference object, the physical reference object having one or more physical dimensions;

in response to receiving the selection of the image of the reference object, adjust either a size of the displayed at least one image of the art object of interest or a size of a visual representation of the reference object such that the visual representation of the art object of interest and the visual representation of the reference object are proportionate in size to each other based at least in part on the one or more physical dimensions of the physical art object and the one or more physical dimensions of the physical reference object; and automatically cause a display of the visual representation of the reference object concurrently in relation to the visual representation of the art object of interest in the online session of the second type.

11. A non-transitory medium that stores computer-readable instructions that when executed by at least one computer system cause the at least one computer system to perform:

electronically providing access to a user enabling the user's participation in an online session of the first type;

receiving a selection of an image of a first art object of interest from at least one session leader of the online session of the first type, the first art object of interest being a physical art object, the physical art object having one or more physical dimensions;

receiving a selection of an image of a first reference object, from the at least one session leader of the session, the first reference object being a physical reference object, the physical reference object having one or more physical dimensions; and in response to receiving the selection of the image of the first art object of interest and receiving the selection of the image of the first reference object, electronically displaying at least one image that concurrently shows a visual representation of the first art object of interest and a visual representation of the first reference object in which the visual representation of the first art object of interest and the visual representation of the first reference object are proportionate in size to each other based at least in part on the one or more physical dimensions of the physical art object and the one or more physical dimensions of the physical reference object;

receiving a request from the user to initiate an online session of a second type;

limiting access to the online session of the second type to the at least one session leader of the online session of the first type and the user;

receive a selection of an image of a second reference object from the user, the second reference object being a second physical reference object, the second physical reference object having one or more physical dimensions;

in response to receiving the selection of the image of the second reference object, adjust either a size of the displayed at least one image of the first object of interest or a size of a visual representation of the second reference object such that the visual representation of the first object of interest and the visual representation of the second reference object are proportionate in size to each other based at least in part on the one or more physical dimensions of the physical art object and the one or more physical dimensions of the second physical reference object; and automatically cause a display of the visual representation of the second reference object concurrently in relation to the visual representation of the first object of interest in the online session of the second type.

12. The method of claim 10 wherein receiving a digital image data that represents an image of a physical place in which an art object of interest may be potentially placed includes:

receiving digital image data indicative of a perspective view of the physical place in which the physical art object may be potentially placed.

13. The method of claim 12 wherein receiving digital image data indicative of a perspective view of the physical place in which the physical art object may be potentially placed includes:

receiving digital image data indicative of at least one surface on which the physical art object may be potentially placed, the at least one surface forming a portion of a first plane intersecting a second plane that includes at least a portion of an imaging sensor providing the digital image data.

14. The method of claim 12 wherein receiving digital image data indicative of a perspective view of the physical place in which the physical art object may be potentially placed includes:

receiving digital image data indicative of at least two surfaces, at least one of the at least two surfaces providing a surface on which the physical art object may be potentially placed, the at least two surfaces each forming portions of respective first and second intersecting planes, the first and second intersecting planes each intersecting a third plane that includes at least a portion of an imaging sensor providing the digital image data.

15. The method of claim 10 wherein receiving a selection, from an image of the art object of interest within the session includes receiving a selection indicative of at least one of a piece of furniture, a painting, or a sculpture.

16. A computer-implemented method of presenting objects for review, the method comprising:

providing remote access to a user to participate remotely in an online session of a first type;

creating the online session of the first type;

causing a remote displaying, under control of at least one session leader of the online session of the first type, a number of images of a plurality of art objects to the user during the online session of the first type;

electronically receiving an indication of interest of the user to participate in an online session of a second type based on a user-selected art object of interest chosen by the user from the plurality of art objects;

creating the online session of the second type;

limiting access to the online session of the second type to the at least one session leader of the online session of the first type and the user;

receiving an electronic representation of a physical room in which the user-selected art object of interest may be potentially placed, the physical room having one or more physical dimensions;

receiving an image that include the user-selected art object of interest, the user-selected art object of interest being a physical art object, the physical art object having one or more physical dimensions; and digitally superimposing a visual representation of the user-selected art object of interest on a visual representation of the physical room to provide at least one image in which a visual representation of a particular physical reference object included in the image of the physical room and the visual representation of the user-selected art object of interest are proportionate in size to each other based at least in part on the one or more physical dimensions of the physical art object and the one or more physical dimensions of the physical room and at an exact or approximate angle of view corresponding to an angle of view and perceived distance of the particular physical reference object within the image of the physical room from a defined point of view.

17. A computer-implemented method of presenting objects for review, the method comprising:

providing remote access to a user to participate remotely in an online session of a first type;

creating the online session of the first type;

causing a remote displaying, under control of at least one session leader of the online session of the first type, a number of images of a plurality of objects to the user during the online session of the first type;

electronically receiving an indication of interest of the user to participate in an online session of a second type based on a user-selected object of interest chosen by the user from the plurality of objects;

creating the online session of the second type;

limiting access to the online session of the second type to the at least one session leader of the online session of the first type and the user;

receiving an electronic representation of a physical location in which the user-selected object of interest may be potentially placed, the physical location having one or more physical dimensions;

receiving a selection indicative of the user-selected object of interest, the user-selected object of interest being a physical object, the physical object having one or more physical dimensions;

identifying at least a first reference object in a visual representation of the physical location, the first reference object representative of a physical reference object having one or more physical dimensions;

determining at least one dimension of the physical reference object; and digitally superimposing a visual representation of the user-selected object of interest on the visual representation of the physical location to provide at least one image in which a visual representation of the physical location and the visual representation of the user-selected object of interest are proportionate in size to each other based at least in part on the one or more physical dimensions of the physical object and the one or more physical dimensions of the physical location.

18. The computer-implemented method of claim 17 wherein digitally superimposing a visual representation of the object of interest on the visual representation of the physical location includes:

digitally superimposing the visual representation of the object of interest on the visual representation of the physical location at an exact or approximate angle of view corresponding to an angle of view and perceived distance of the first reference object within the image of the physical location from a defined point of view.

19. The computer-implemented method of claim 17 wherein identifying at least a first reference object in a visual representation of the physical location includes: receiving an input from the user.

20. The computer-implemented method of claim 17 wherein identifying at least a first reference object in a visual representation of the physical location includes: identifying a number of corners of the first reference object.

21. The computer-implemented method of claim 17 wherein determining at least one dimension of the first reference object includes: receiving an input from the user.

22. The computer-implemented method of claim 17 wherein receiving a selection indicative of the object of interest includes: receiving an input from the user via at least one user-operated processor-based system, the input indicative of one of a plurality of objects offered for sale.

23. The computer-implemented method of claim 1, the method further comprising:
   determining an adjustment in a size of the appearance of at least one of the art object of the first reference object in at least one image based at least in part on the one or more physical dimensions of the physical art object and the one or more physical dimensions of the physical reference object.

* * * * *